(12) United States Patent
Otani et al.

(10) Patent No.: US 8,473,763 B2
(45) Date of Patent: Jun. 25, 2013

(54) IMAGE FORMING APPARATUS

(75) Inventors: Atsushi Otani, Moriya (JP); Shoji Takeda, Tokyo (JP); Satoru Yamamoto, Abiko (JP); Keita Takahashi, Abiko (JP); Hirotaka Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 233 days.

(21) Appl. No.: 12/907,410

(22) Filed: Oct. 19, 2010

(65) Prior Publication Data

US 2011/0107128 A1 May 5, 2011

(30) Foreign Application Priority Data

Nov. 5, 2009 (JP) ................................. 2009-254448

(51) Int. Cl.
*G06F 1/26* (2006.01)
*G06F 1/32* (2006.01)

(52) U.S. Cl.
CPC .................................. *G06F 1/3203* (2013.01)
USPC ........................................................ 713/320

(58) Field of Classification Search
USPC ................................................. 713/300–340
See application file for complete search history.

(56) References Cited

U.S. PATENT DOCUMENTS

| | | | | |
|---|---|---|---|---|
| 5,471,621 A * | 11/1995 | Ohtsuki | ........................ | 713/323 |
| 6,807,907 B2 * | 10/2004 | Yamada | ........................ | 101/484 |
| 6,879,410 B1 * | 4/2005 | Tokura | ......................... | 358/1.14 |
| 7,334,146 B2 * | 2/2008 | Kobayashi et al. | ........... | 713/324 |
| 7,886,170 B2 * | 2/2011 | Komatsu et al. | .............. | 713/323 |
| 8,027,046 B2 * | 9/2011 | Yamasaki | .................... | 358/1.14 |
| 8,046,613 B2 * | 10/2011 | Enami et al. | .................. | 713/320 |
| 8,099,613 B2 * | 1/2012 | Suzuki | .......................... | 713/320 |
| 2007/0106918 A1 * | 5/2007 | Oyanagi | ....................... | 713/300 |
| 2007/0260753 A1 | 11/2007 | Komatsu et al. | | |
| 2009/0144573 A1 * | 6/2009 | Ohhashi | ....................... | 713/323 |
| 2009/0185211 A1 * | 7/2009 | Sunayama | ................... | 358/1.13 |
| 2011/0035739 A1 * | 2/2011 | Harada | ......................... | 717/168 |
| 2011/0083027 A1 * | 4/2011 | Takagi | .......................... | 713/323 |

FOREIGN PATENT DOCUMENTS

| | | |
|---|---|---|
| JP | 06-149406 A | 5/1994 |
| JP | 10-031531 A | 2/1998 |
| JP | 10-247125 A | 9/1998 |
| JP | 2007-290258 A | 11/2007 |

* cited by examiner

*Primary Examiner* — Raymond Phan
(74) *Attorney, Agent, or Firm* — Fitzpatrick, Cella, Harper & Scinto

(57) ABSTRACT

Provided is an image forming apparatus that realizes a distributed control system with a reduced number of power lines, and that has highly reliable power supply and an effective power saving mode. To accomplish this, the image forming apparatus employs a distributed control system including a master CPU, a plurality of sub master CPUs, and a plurality of slave CPUs. The master CPU supplies 5-V power to the sub master CPUs and the slave CPUs in the power saving mode, and supplies 24-V power thereto in a normal mode. Also, the sub master CPUs determine the operating mode in accordance with the level of the supplied power voltage, and operate accordingly.

10 Claims, 15 Drawing Sheets

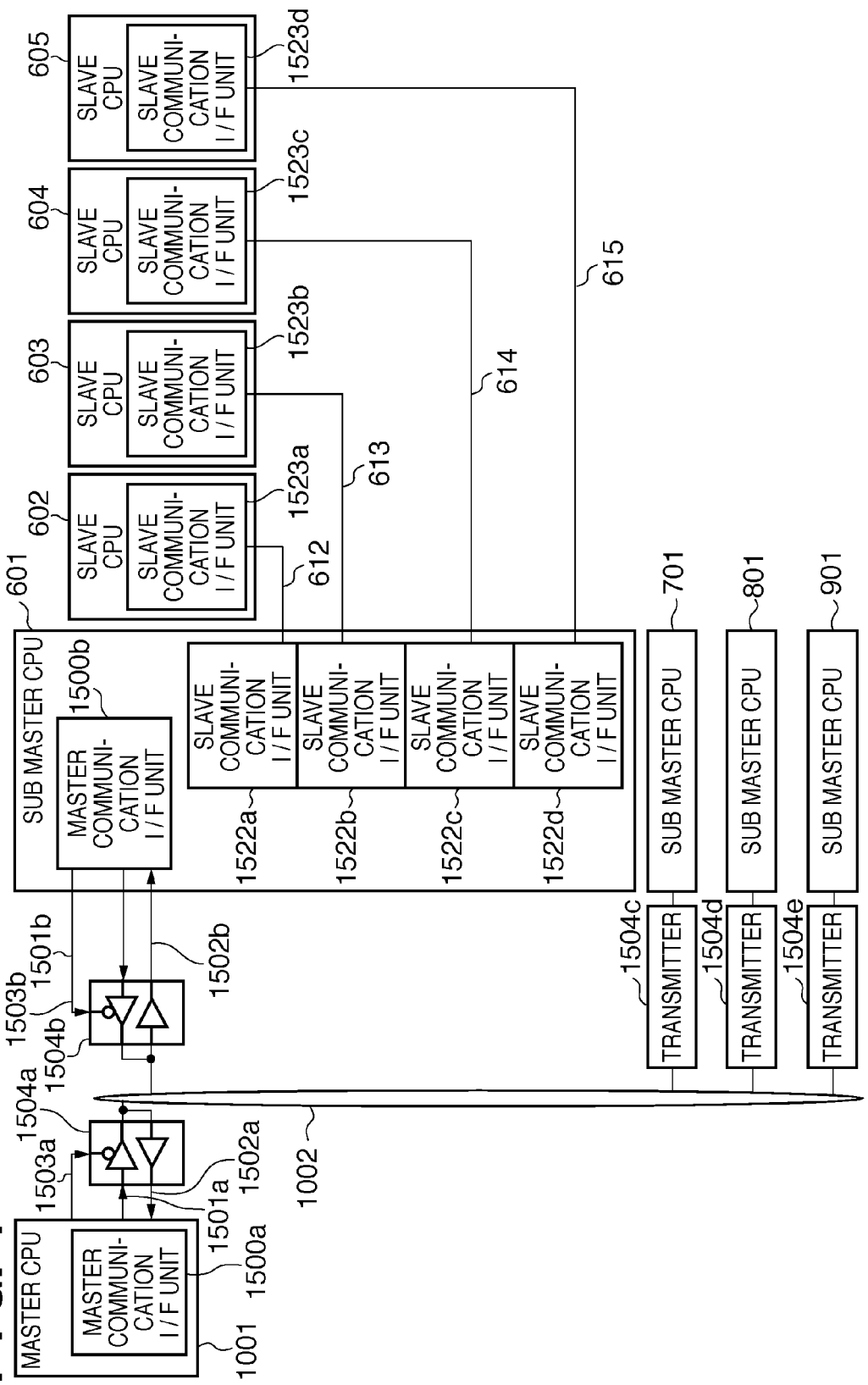

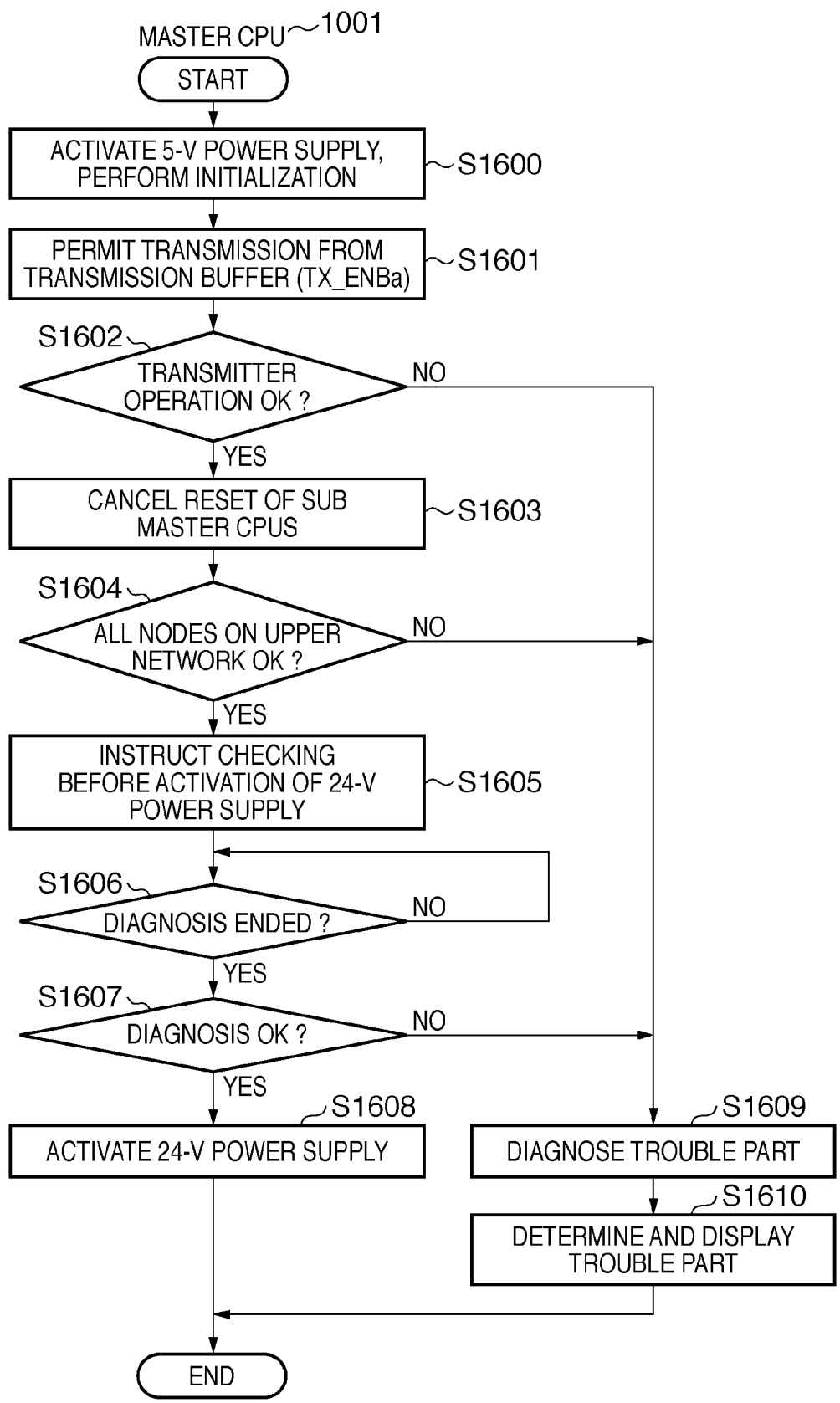

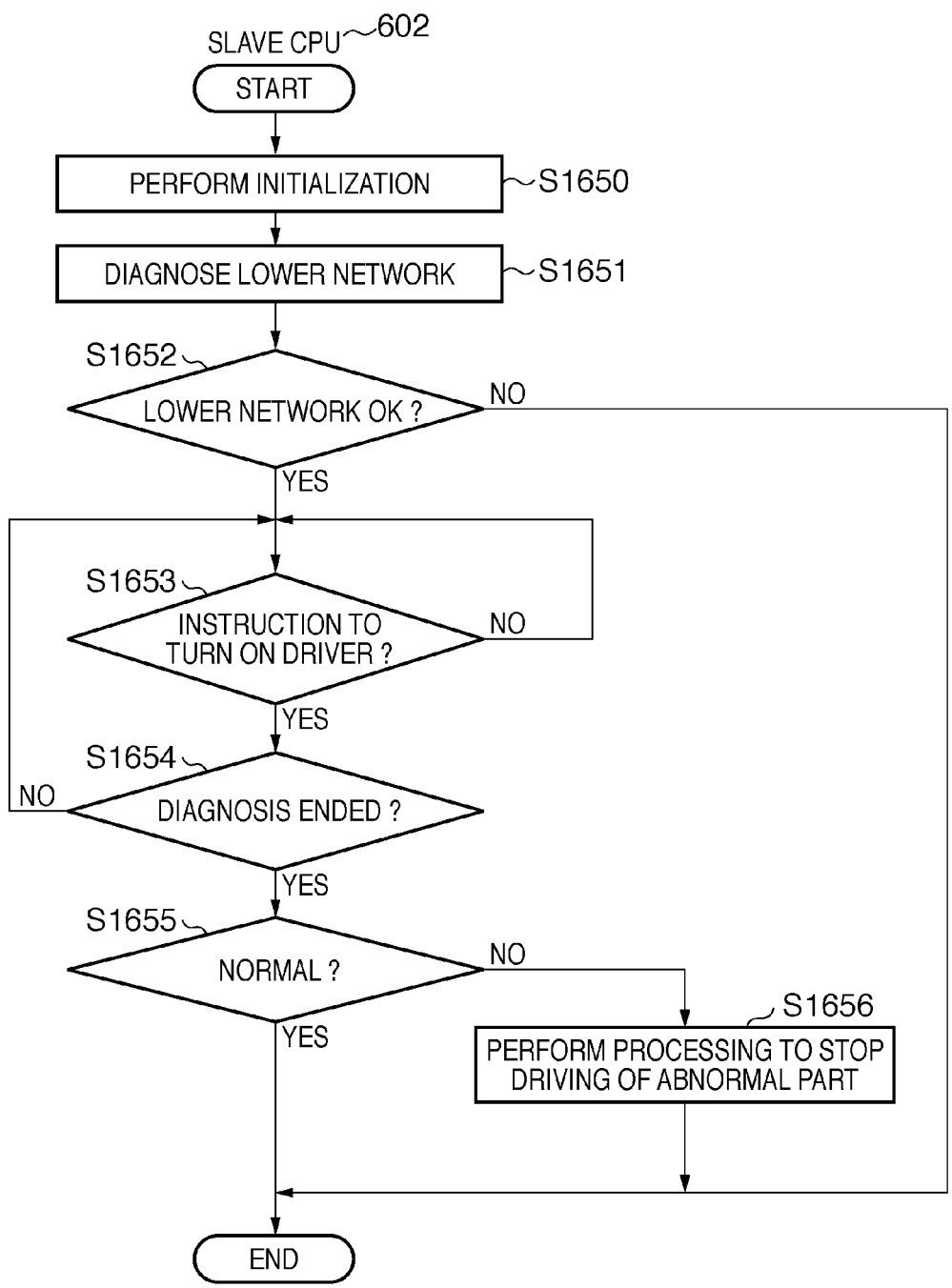

FIG. 9A

| STATE NAME | off | INIT1 | INIT2 | INIT3 | INIT4 | INIT5 | IDLE | SLEEP1 |
|---|---|---|---|---|---|---|---|---|
| DEVICE OPERATING STATE | POWER OFF | POWER ON, INITIALIZE (MAIN) | POWER ON, INITIALIZE (SUB MASTER) | POWER ON, INITIALIZE (SLAVE) | POWER ON, INITIALIZE (test 1) | POWER ON, INITIALIZE (test 2) | STANDBY | POWER SAVING STATE 1 |
| MASTER CPU STATE | POWER OFF | POWER ON, INITIALIZE | POWER ON, NORMAL OSCILLATION | | | | | |

POWER SUPPLY UNIT 1401 PERIPHERALS

| | off | INIT1 | INIT2 | INIT3 | INIT4 | INIT5 | IDLE | SLEEP1 |
|---|---|---|---|---|---|---|---|---|
| OR LOGIC GATE 1426 OUTPUT | 'L' | | | | | | 'H' (OUTPUT PERMITTED) | |
| OR LOGIC GATE 1423 OUTPUT | 'L' | 'L' (OUTPUT PROHIBITED) | | | | | 'H' (OUTPUT PERMITTED) | 'L' (OUTPUT PROHIBITED) |
| POWER LINE 1407 VOLTAGE | POWER OFF | 5V | | | | | 24V | 5V |

VOLTAGE DETECTION UNIT 1410

| | off | INIT1 | INIT2 | INIT3 | INIT4 | INIT5 | IDLE | SLEEP1 |
|---|---|---|---|---|---|---|---|---|
| LEVEL SIGNAL 1414 | 'L' OFF | 'L' (5V) | | | | | 'H' (24V) | 'H' (5V) |

SUB MASTER CPU

| | off | INIT1 | INIT2 | INIT3 | INIT4 | INIT5 | IDLE | SLEEP1 |
|---|---|---|---|---|---|---|---|---|
| SUB MASTER CPU STATE | POWER OFF | POWER ON, DURING RESET | POWER ON, NORMAL OSCILLATION, TRANSMITTER 1504 OPERATING | | | | | POWER ON, LOW-SPEED OSCILLATION, TRANSMITTER 1504 STOPPED |
| INIT SIGNAL 1421 | 'L' OFF | 'L' (OUTPUT PROHIBITED) | | 'H' (OUTPUT PERMITTED) | 'L' (OUTPUT PROHIBITED) | | | |
| ENABLE SIGNAL 1417 | 'L' OFF | 'L' (OUTPUT PROHIBITED) | | | 'H' (OUTPUT PERMITTED) | | | |
| OR LOGIC GATE 1415 OUTPUT | 'L' OFF | 'L' (OUTPUT PROHIBITED) | | | 'H' (OUTPUT PERMITTED) | | | |
| OR LOGIC GATE 1420 OUTPUT | 'L' OFF | 'L' (OUTPUT PROHIBITED) | | 'H' (OUTPUT PERMITTED) | | | | |
| POWER LINE 1419 VOLTAGE | POWER OFF | POWER OFF | | | | | 3.3V | |
| POWER LINE 1418 VOLTAGE | POWER OFF | POWER OFF | | 5V | 24V | | | POWER OFF |
| SLAVE CPU STATE | POWER OFF | POWER OFF | POWER OFF | POWER ON, NORMAL OSCILLATION | | | | POWER ON, LOW-SPEED OSCILLATION |

FIG. 9B

| | ΔT₁ | ΔT₂ | ΔT₃ | | |
|---|---|---|---|---|---|
| active | IDLE | SLEEP1 | SLEEP2 | SLEEP3 | INIT1 | INIT6 |

| DEVICE OPERATING STATE | STANDBY | POWER SAVING STATE 1 | POWER SAVING STATE 2 | POWER SAVING STATE 3 | POWER ON, INITIALIZE | POWER ON, INITIALIZE (SHORT) |
|---|---|---|---|---|---|---|
| POWER ON, NORMAL OSCILLATION | | | | POWER OFF | POWER ON, INITIALIZE | POWER ON, NORMAL OSCILLATION |
| 'H' (OUTPUT PERMITTED) | | | | 'L' (OUTPUT PROHIBITED) | 'H' (OUTPUT PERMITTED) | |
| 'H' (OUTPUT PERMITTED) | | 'L' (OUTPUT PROHIBITED) | 'L' (OUTPUT PROHIBITED) | | 'H' (OUTPUT PERMITTED) | |
| 24V | | 5V | | POWER OFF | 24V | |
| 'H' (24V) | | 'L' (5V) | | 'L' OFF | 'H' (24V) | |
| POWER ON, NORMAL OSCILLATION, TRANSMITTER 1504 OPERATING | | POWER ON, LOW-SPEED OSCILLATION, TRANSMITTER 1504 STOPPED | | POWER OFF | POWER ON, LOW-SPEED OSCILLATION, TRANSMITTER 1504 STOPPED | |
| 'L' (OUTPUT PROHIBITED) | | | | | | |
| 'H' (OUTPUT PERMITTED) | | 'L' (OUTPUT PROHIBITED) | | | 'H' (OUTPUT PERMITTED) | |
| 'H' (OUTPUT PERMITTED) | | | | 'L' OFF | 'H' (OUTPUT PERMITTED) | |
| 'H' (OUTPUT PERMITTED) | | | | 'L' (OUTPUT PROHIBITED) | 'H' (OUTPUT PERMITTED) | |
| 3.3V | | | | POWER OFF | 3.3V | |
| 24V | | | | POWER OFF | 24V | |
| POWER ON, NORMAL OSCILLATION | POWER ON, LOW-SPEED OSCILLATION | | | POWER OFF | POWER ON, NORMAL OSCILLATION | |

IMAGE FORMING APPARATUS

BACKGROUND OF THE INVENTION

1. Field of the Invention

The present invention relates to an image forming apparatus realized by a distributed control system having a group of CPUs in a hierarchical structure.

2. Description of the Related Art

In printer device control in an image forming apparatus that employs an electrophotographic system, centralized control is performed by one CPU. However, a higher performance CPU has become necessary due to an increase in CPU load due to control being focused on one point. Furthermore, along with the increase in the printer device control load, it is necessary to extend communication cables (a communication wire harness) from the CPU board to a control load driver unit that is far away, and a large number of lengthy communication cables have become necessary. In order to address this problem, attention has been placed on a form of control in which control modules that configure an electrophotographic system are distributed among individual sub CPUs.

Examples of the construction of a control system in which individual partial module control functions are distributed among multiple CPUs have been proposed in several control device product fields. For example, Japanese Patent Laid-Open No. 10-31531 proposes technology to save power by performing control that lowers the CPU clock frequency and the supply voltage in accordance with the device operating state. Also, Japanese Patent Laid-Open No. 06-149406 proposes technology that switches the operating frequency of a CPU of a main control unit in accordance with a notification from a power control CPU, which is based on battery voltage information. Also, Japanese Patent Laid-Open No. 2007-290258 proposes a method in which a master CPU sends a notification regarding the device operating mode to a slave CPU, and the slave CPU switches operations in accordance with an operating table corresponding to the mode. Furthermore, Japanese Patent Laid-Open No. 10-247125 proposes technology in which a diode OR circuit switches between backup voltage power and normal voltage power, the level of the supplied voltage is detected, and the operating mode is changed.

However, the following problems occur when the above-described examples of technology are applied to a distributed system. For example, in the case of saving power by performing control to lower the CPU clock frequency and lower the supply voltage in accordance with the device operating state, the method for controlling the operation clock of the CPU and the supply voltage has the risk of a system abnormality occurring if a voltage corresponding to the operation clock is not supplied. If the difference in the detected voltage is low, a highly precise voltage detection unit is necessary, and reverting from the power saving mode requires communication between boards to be continued, or control by a special recovery notification unit. In the case of maintaining communication, there is a limit to power saving since communication units consume current and the CPU operates at a minimum frequency in order to maintain communication. Furthermore, providing a special recovery notification unit leads to a more complex apparatus and an increase in cost. Also, if the technology disclosed in Japanese Patent Laid-Open No. 10-247125 is applied as is to an integrated device in an image forming system or the like, coordinated operation cannot be performed between distributed control units, the time required for recovery to normal operations becomes longer, and device management cannot be performed during the power saving mode.

Also, with a distributed system, there is an increase in the number of power lines since boards to which power is supplied from a power unit are also distributed. The number of power lines increases in accordance with the degree to which the boards are distributed and the number of types of power that are supplied. Increasing the number of power lines invites a rise in cost, and may also lead to a connection fault. Since the voltage of the power used to drive a motor or the like is higher than that for a control IC such as a CPU/ASIC, and the current capacity is higher as well, a fault such as a short would cause a large amount of damage to the device, and therefore a high level of safety is demanded. For example, power control needs to be performed so as to prevent a situation in which power is erroneously supplied to only a load, and not to a control unit.

SUMMARY OF THE INVENTION

The present invention enables realization of an image forming apparatus that realizes a distributed control system having a reduced number of power lines, and also has highly reliable power supply and an effective power saving mode.

One aspect of the present invention provides an image forming apparatus comprising: a first layer control unit that performs overall control of the image forming apparatus for forming an image on a printing material; a second layer control unit that is controlled by the first layer control unit and controls an object that is for executing image formation; and a power supply unit that selectively supplies, to the second layer control unit, a first voltage and a second voltage that is higher than the first voltage, wherein in a power saving mode, the first layer control unit causes the power supply unit to supply the first voltage to the second layer control unit, and in a normal mode, the first layer control unit causes the power supply unit to supply the second voltage to the second layer control unit, the second layer control unit comprises a voltage detection unit that detects a voltage supplied from the power supply unit, and the second layer control unit executes the power saving mode in a case where the voltage detection unit has detected the first voltage, and executes the normal mode in a case where the voltage detection unit has detected the second voltage.

Another aspect of the present invention provides an image forming apparatus comprising: a first control unit and a second control unit that control a load that is for forming an image on a printing material; and a power supply unit that selectively supplies, to the second control unit, a first voltage and a second voltage that is higher than the first voltage, wherein in a power saving mode, the first control unit causes the power supply unit to supply the first voltage to the second control unit, and in a normal mode, the first control unit causes the power supply unit to supply the second voltage to the second control unit, the second control unit comprises a voltage detection unit that detects a voltage supplied from the power supply unit, and the second control unit executes the power saving mode in a case where the voltage detection unit has detected the first voltage, and executes the normal mode in a case where the voltage detection unit has detected the second voltage.

Further features of the present invention will be apparent from the following description of exemplary embodiments with reference to the attached drawings.

BRIEF DESCRIPTION OF THE DRAWINGS

FIG. 7 is a diagram showing an example of connections to a network-type communication bus and a high-speed serial communication bus according to Embodiment 1.

FIGS. 8A to 8D are a flowchart showing a processing procedure performed by each CPU when activating power according to Embodiment 1.

FIGS. 9A and 9B are a timing chart showing changes in power supply and operation timings of the sub master CPUs according to Embodiment 1.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Configuration of Image Forming Apparatus

Figure 1:
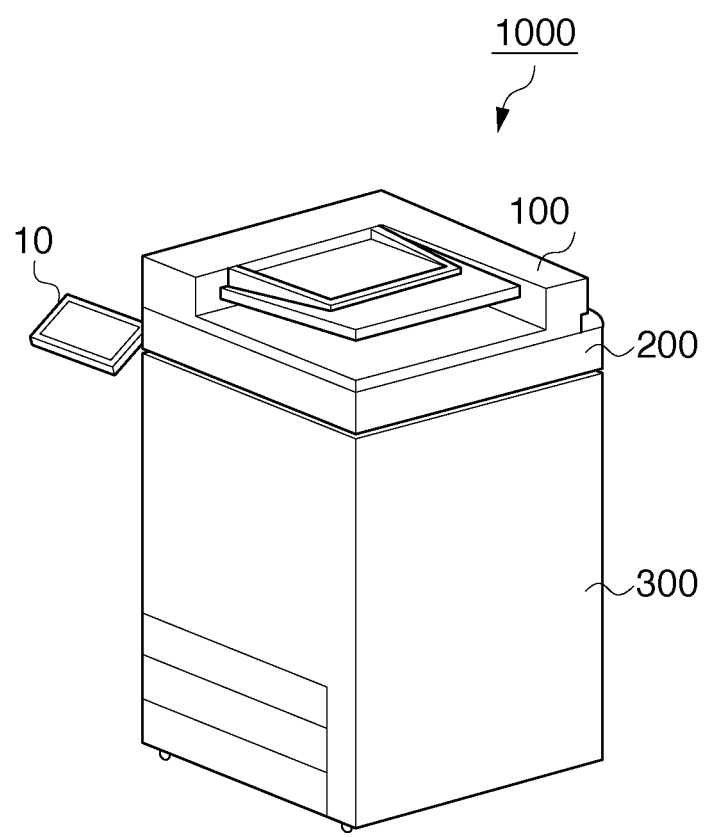
FIG. 1 is a diagram showing an overview of an image forming apparatus 1000 according to Embodiment 1.

Below is a description of Embodiment 1 with reference to FIGS. 1 to 10. FIG. 1 is a diagram showing an overview of an image forming apparatus 1000 according to Embodiment 1. The image forming apparatus 1000 includes an automatic document feeder 100, an image reading unit 200, an image forming unit 300, and an operation unit 10. As shown in FIG. 1, the image reading unit 200 is placed on the image forming unit 300. Furthermore, the automatic document feeder (DF) 100 is placed on the image reading unit 200. Also, the image forming apparatus 1000 of the present embodiment realizes distributed control with use of a plurality of control units (CPUs). The configuration of each CPU is described later with reference to FIG. 3.

The automatic document feeder 100 automatically feeds an original onto a glass platen. The image reading unit 200 reads the original fed by the automatic document feeder 100 and outputs image data. The image forming unit 300 forms an image on a printing material in accordance with image data that has been output from the automatic document feeder 100 or image data that has been input from an external apparatus connected thereto via a network. The operation unit 10 has a graphical user interface (GUI) for allowing a user to perform various operations. Furthermore, the operation unit 10 has a display unit such as a touch panel, and can also present information to the user.

Figure 2:
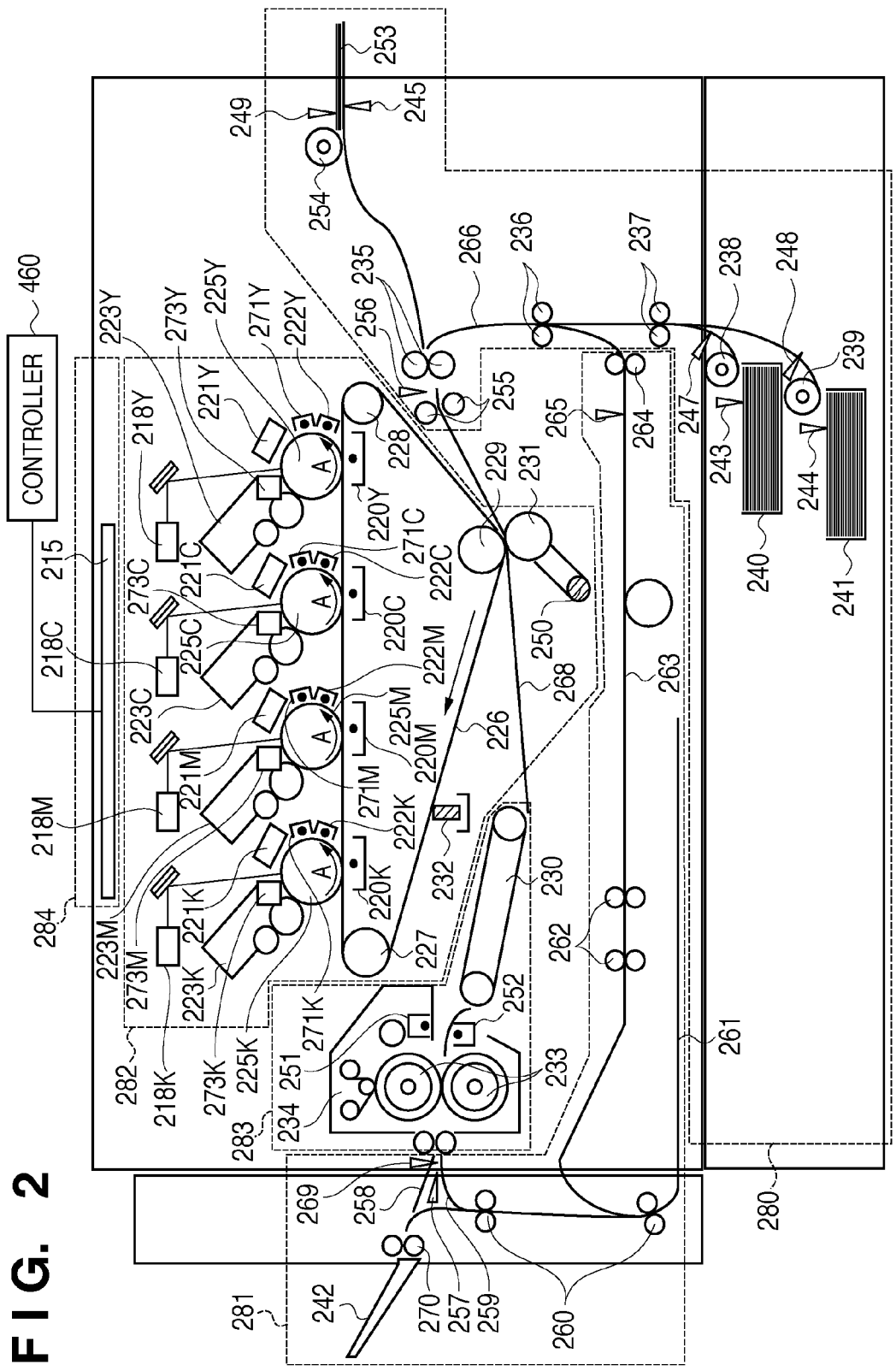
FIG. 2 is a cross-sectional diagram showing an example of a configuration of an image forming unit 300 according to Embodiment 1.

Next is a detailed description of the image forming unit 300 with reference to FIG. 2. Note that the image forming unit 300 of the present embodiment employs an electrophotographic system. It should also be noted that the letters Y, M, C, and K appended to reference numerals in FIG. 2 indicate engines corresponding to yellow, magenta, cyan, and black toner respectively. Hereinafter, reference numerals are not appended with the letters Y, M, C, or K when collectively referring to engines corresponding to all colors of toner, and reference numerals are appended with the letters Y, M, C, or K when referring to engines individually.

Photoconductor drums (hereinafter, simply referred to as "photoconductors") 225 for forming a full-color electrostatic image as an image carrier are provided so as to be rotatable in the direction of the arrow A by a motor. Disposed in the periphery of each photoconductor 225 is a primary charger 221, an exposure device 218, a development device 223, a transfer device 220, a cleaner device 222, a charge remover 271, and a surface electrometer 273.

The development device 223K is a development device for monochromatic development, and develops a latent image on the photoconductor 225K with K toner. Also, the development devices 223Y, 223M, and 223C are development devices for full-color development, and they respectively develop latent images on the photoconductors 225Y, 225M, and 225C with Y, M, and C toner. The colored toner images developed on the photoconductors 225 are collectively transferred in multiple layers onto a transfer belt 226, which is an intermediate transfer member, by the transfer devices 220, thus superimposing the four colors of toner images.

The transfer belt 226 is wound around rollers 227, 228, and 229. The roller 227 is linked to a drive source and functions as a drive roller that drives the transfer belt 226, and the roller 228 functions as a tension roller that adjusts the tension of the transfer belt 226. The roller 229 functions as a backup transfer roller in a secondary transfer device 231. A transfer roller drive unit 250 is a drive unit for causing the secondary transfer device 231 to be in contact with or separated from the transfer belt 226. A cleaner blade 232 is provided below the transfer belt 226 in a position after the secondary transfer device 231 in the traveling direction of the transfer belt 226, and residual toner on the transfer belt 226 is scraped off by the cleaner blade 232.

A printing material (printing sheet) stored in a cassette 240 or 241 or a manual feed unit 253 is fed by a registration roller 255, a paper feed roller pair 235, and vertical path roller pairs 236 and 237 to a nip part, that is to say, an area of contact between the secondary transfer device 231 and the transfer belt 226. Note that at this time, the secondary transfer device 231 is in contact with the transfer belt 226 due to the transfer roller drive unit 250. The toner image formed on the transfer belt 226 is transferred to the printing material at this nip part. Thereafter, the toner image that has been transferred to the printing material is heat-fixed thereto by a fixing device 234, and the printing material is discharged out of the device.

The cassettes 240 and 241 and the manual feed unit 253 respectively include no-sheet detection sensors 243, 244, and 245 for detecting the presence or absence of a printing material. Also, the cassettes 240 and 241 and the manual feed unit 253 respectively include paper feed sensors 247, 248, and 249 for detecting a fault in printing material pickup.

Next is a description of an image forming operation performed by the image forming unit 300. When imaging forming begins, printing material stored in the cassette 240, the cassette 241, or the manual feed unit 253 is fed sheet-by-sheet to the paper feed roller pair 235 by a pickup roller 238, 239, or 254. The printing material is fed to the registration roller 255 by the paper feed roller pair 235, and thereafter a resist sensor 256 positioned immediately in front of the registration roller 255 detects that the printing material has passed.

In the present embodiment, when the resist sensor 256 has detected that the printing material has passed, the feeding operation is once interrupted after a predetermined time has elapsed. As a result, although the printing material comes into contact with the stopped registration roller 255 and feeding thereof stops, at this time the feeding position is fixed such that the end part of the printing material in the traveling direction is perpendicular to the feeding path, thus correcting obliqueness, which is a state in which the feeding direction of the printing material is out of alignment with respect to the feeding path. Hereinafter, this processing is called "position correction". Position correction is necessary in order to minimize tilt of the image forming direction with respect to the printing material thereafter. After position correction, the printing material is supplied to the secondary transfer device 231 by activating the registration roller 255. Note that the registration roller 255 is linked to a drive source, and is rotationally driven due to drive being transmitted by a clutch.

Next, a voltage is applied to the primary chargers 221, and the surfaces of the photoconductors 225 are uniformly negatively charged with a predetermined charge part potential. Subsequently, the exposure devices 218 that each include a laser scanner unit perform exposure such that image portions on the charged photoconductors 225 have a predetermined exposure part potential, thus forming latent images. The exposure devices 218 form latent images that correspond to an image by turning laser light on and off based on image data sent thereto from the controller 460 via a printer control I/F 215. Note that the surface electrometers 273 measure and output the surface potentials of the photoconductors 225 whose surfaces were uniformly charged by the primary chargers 221.

Also, preset developing biases that have been preset for each color are applied to the developing rollers of the development devices 223, and the latent images are visualized as toner images by being developed with use of toner when the latent images pass the positions of the developing rollers. The toner images are transferred to the transfer belt 226 by the transfer devices 220 and then transferred by the secondary transfer device 231 to the printing material that has been fed by the paper feed unit, and thereafter the printing material passes along a post-resist feeding path 268 and is fed to the fixing device 234 via a fixing feed belt 230.

In the fixing device 234, firstly in order to reinforce toner adsorption and prevent image disturbance, the printing material is charged by pre-fixing chargers 251 and 252, and then the toner image is heat-fixed thereto by a fixing roller 233. Thereafter, the feeding path is switched to a discharge path 258 side by a discharge flapper 257, and thus a discharge roller 270 discharges the printing material as is to a discharge tray 242.

Toner that remains on the photoconductors 225 is removed by the cleaner devices 222 and recovered. Lastly, the photoconductors 225 are uniformly neutralized to around 0 volts by the charge remover 271 to prepare for the next image forming cycle.

Regarding the start timing of color image formation by the image forming apparatus 1000, Y, M, C, and K transfer is simultaneous, and therefore image formation can be performed at an arbitrary position on the transfer belt 226. However, in the determination of image formation start timings, it is necessary to shift timings in accordance with amounts of displacement between the positions where toner images on the photoconductors 225Y, 225M, and 225C are transferred.

Note that in the image forming unit 300, printing material can be successively feed by the cassettes 240 and 241 and the manual feed unit 253. In this case, in consideration of the sheet length of the previous printing material, printing material is fed from the cassettes 240 and 241 and the manual feed unit 253 with a short gap therebetween so as to not overlap. As described above, although the recording material is supplied to the secondary transfer device 231 by activating the registration roller 255 after position correction, the registration roller 255 is again temporarily stopped when the printing material reaches the secondary transfer device 231. This is performed so that position correction is performed on the subsequent printing material in the same manner as with the previous printing material.

Next is a detailed description of operations in the case of forming an image on the back face of a printing material. When forming an image on the back face of a printing material, firstly image formation is performed on the front face of the printing material. If an image is to be formed on only the front face, the toner image is heat-fixed by the fixing device 234, and thereafter the printing material is discharged as is to the discharge tray 242. On the other hand, in the case of subsequently performing image formation on the back face, when the printing material is detected by a sensor 269, the discharge flapper 257 switches the feeding path to a back face path 259 side, and an inversion roller 260 is rotationally driven in conjunction with this, thus feeding the printing material to a double-side inversion path 261. Thereafter, the printing material is fed along the double-side inversion path 261 by an amount equal to the feed direction width, the traveling direction is then switched by reverse rotational driving of the inversion roller 260, the front face having an image formed thereon is caused to face downward, and the printing material is then fed to a double-side path 263 by driving a double-side path feeding roller 262.

Next, the printing material is fed along the double-side path 263 toward a re-feed roller 264, and thereafter a re-feed sensor 265 positioned immediately in front of the re-feed roller 264 detects that the printing material has passed. In the present embodiment, when the re-feed sensor 265 has detected that the printing material has passed, the feeding operation is once interrupted after a predetermined time has elapsed. As a result, although the printing material comes into contact with the stopped re-feed roller 264 and feeding thereof stops, at this time the position is fixed such that the end part of the printing material in the traveling direction is perpendicular to the feeding path, thus correcting obliqueness, which is a state in which the feeding direction of the printing material is out of alignment with respect to the feeding path in the re-feed path. Hereinafter, this processing is called "re-position correction".

Re-position correction is necessary in order to minimize tilt of the image forming direction with respect to the back face of the printing material thereafter. After re-position correction, the printing material is fed along a re-feed path 266 with the back face being inverted, by activating the re-feed roller 264. A description of the image forming operation performed thereafter has been omitted since it is the same as the above-described image forming operation for the front face. The feeding path is switched to the discharge path 258 side by the discharge flapper 257, and thus the printing material with an image formed on both the front and back faces in this way is discharged to the discharge tray 242.

Note that in the image forming unit 300 of the present embodiment, printing material can be supplied successively in double-side printing as well. However, since only one device system for forming an image on a printing material, fixing a toner image that has been formed, and the like is provided, printing on the front face and printing on the back face cannot be performed simultaneously. Accordingly, when performing double-side printing, in the image forming unit 300, image formation is alternately performed on a printing material from the cassette 240 or 241 or the manual feed unit 253, and on the printing material after it has been inverted for printing on the back face and re-supplied to the image forming unit.

In the image forming unit 300 of the present embodiment, the control loads shown in FIG. 2 are divided into four later-described control blocks, namely a feeding module A 280, a feeding module B 281, an imaging module 282, and a fixing module 283, and are controlled autonomously. Furthermore, the image forming unit 300 has a master module 284 for causing the four control blocks to collectively function as an image forming apparatus. Below is a description of a configuration of control of the modules with reference to FIG. 3.

Figure 3:
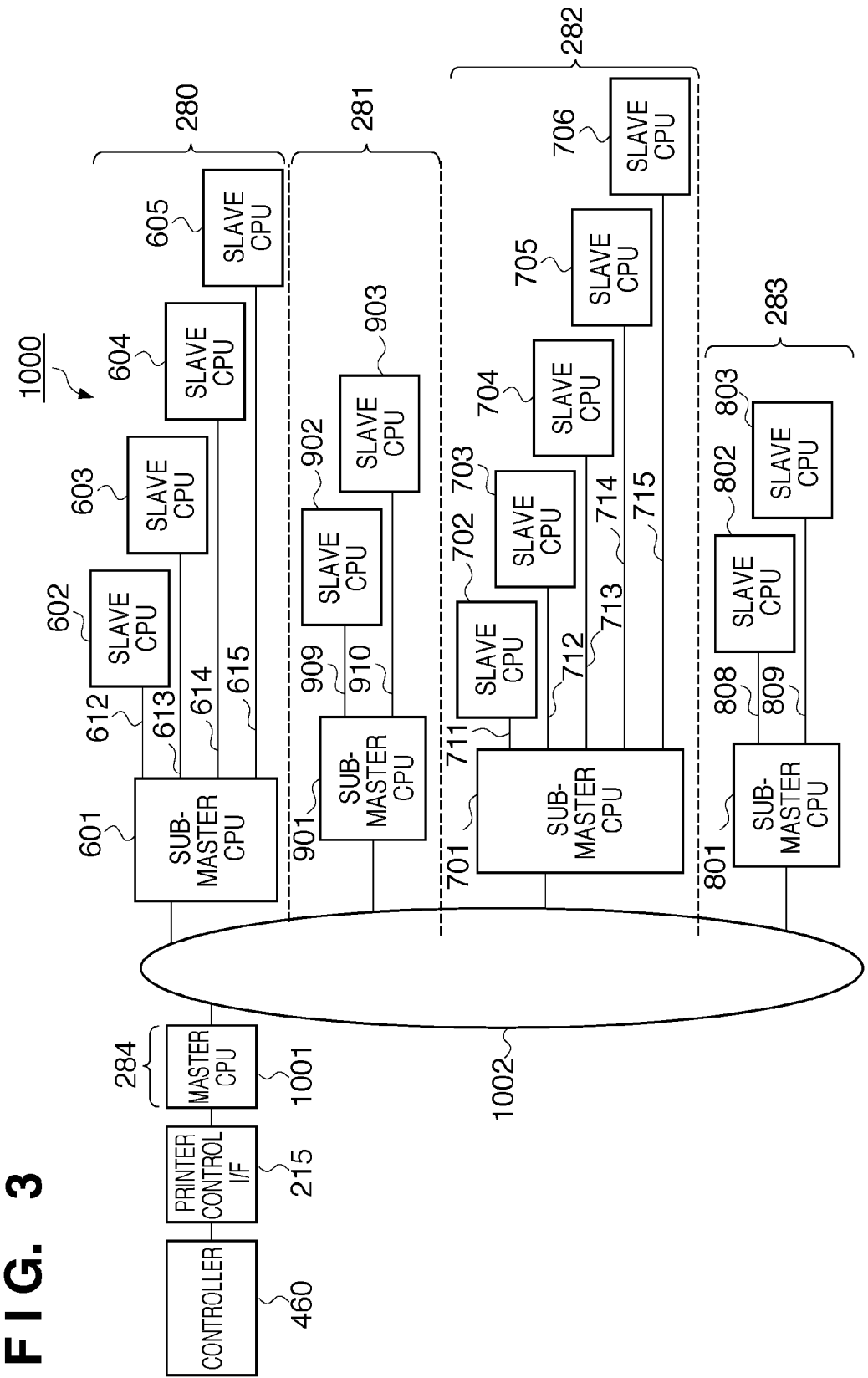
FIG. 3 is a diagram illustrating the relationship between a master CPU, sub master CPUs, and slave CPUs according to Embodiment 1.

FIG. 3 is a diagram illustrating the relationship between a master CPU, sub master CPUs, and slave CPUs according to Embodiment 1. In the present embodiment, a master CPU (master control unit/first layer control unit) 1001 included in the master module 284 performs overall control of the image forming apparatus 1000 based on instructions and image data that have been sent from the controller 460 via the printer control I/F 215. Also, the feeding module A 280, the feeding module B 281, the imaging module 282, and the fixing module 283 for executing image formation respectively include sub master CPUs (sub master control units/second layer control units) 601, 901, 701, and 801 that control various functions. The sub master CPUs 601, 901, 701, and 801 are controlled by the master CPU 1001. Moreover, the function modules furthermore include slave CPUs (slave control units/third layer control units) 602, 603, 604, 605, 902, 903, 702, 703, 704, 705, 706, 802, and 803 for causing the control loads for executing various functions to operate. The slave CPUs 602, 603, 604, and 605 are controlled by the sub master CPU 601, the slave CPUs 902, and 903 are controlled by the sub master CPU 901, the slave CPUs 702, 703, 704, 705, and 706 are controlled by the sub master CPU 701, and the slave CPUs 802 and 803 are controlled by the sub master CPU 801.

As shown in FIG. 3, the master CPU 1001 and the sub master CPUs 601, 701, 801, and 901 are bus-connected in common by a network-type communication bus (first signal line) 1002. The sub master CPUs 601, 701, 801, and 901 are also bus-connected to each other via the network-type communication bus (first signal line) 1002. Note that the master CPU 1001 and the sub master CPUs 601, 701, 801, and 901 may be link-connected. The sub master CPU 601 is furthermore one-on-one connected (peer-to-peer) connected to the slave CPUs 602, 603, 604, and 605 via high-speed serial communication buses (second signal lines) 612, 613, 614, and 615 respectively. Similarly, the sub master CPU 701 is connected to the slave CPUs 702, 703, 704, 705, and 706 via high-speed serial communication buses (second signal lines) 711, 712, 713, 714, and 715 respectively. The sub master CPU 801 is connected to the slave CPUs 802 and 803 via high-speed serial communication buses (second signal lines) 808 and 809 respectively. The sub master CPU 901 is connected to the slave CPUs 902 and 903 via high-speed serial communication buses (second signal lines) 909 and 910 respectively. Here, the high-speed serial communication buses are used in short-range, high-speed communication.

In the image forming apparatus 1000 according to the present embodiment, for control that requires timing-dependent responsiveness, functions are distributed so as to be realized in the function modules integrated under the sub master CPUs. For this reason, communication between each sub master CPU and its slave CPUs for driving terminal control loads is performed via a highly-responsive high-speed serial communication bus. In other words, the signal lines used as the second signals have higher data transfer timing precision than the first signal lines.

On the other hand, exchanges performed between the master CPU 1001 and the sub master CPUs 601, 701, 801, and 901 are merely exchanges for integrating general processing flows for imaging forming operation that do not require precise control timing. For example, the master CPU 1001 sends, to the sub master CPUs, instructions for starting image formation pre-processing, starting paper feeding, and starting image formation post-processing. Also, before image formation is started, the master CPU 1001 sends, to the sub master CPUs, instructions based on a mode (for example, monochrome mode or double-side image formation mode) instructed by the controller 460. Exchanges between the sub master CPUs 601, 701, 801, and 901 are also merely exchanges that do not require precise timing control. Specifically, the control of the image forming apparatus is divided into units of control that do not require precise timing control with respect to each other, and each unit of control is controlled with precise timing by a respective sub master CPU. Accordingly, the image forming apparatus 1000 of the present embodiment enables minimizing communication traffic and enables connection by the low-speed and inexpensive network-type communication bus 1002. Note that the control boards on which the master CPU, the sub master CPUs, and the slave CPUs are implemented do not need to be uniform, and the arrangement thereof can be varied to conform to apparatus mounting circumstances.

Figure 4:
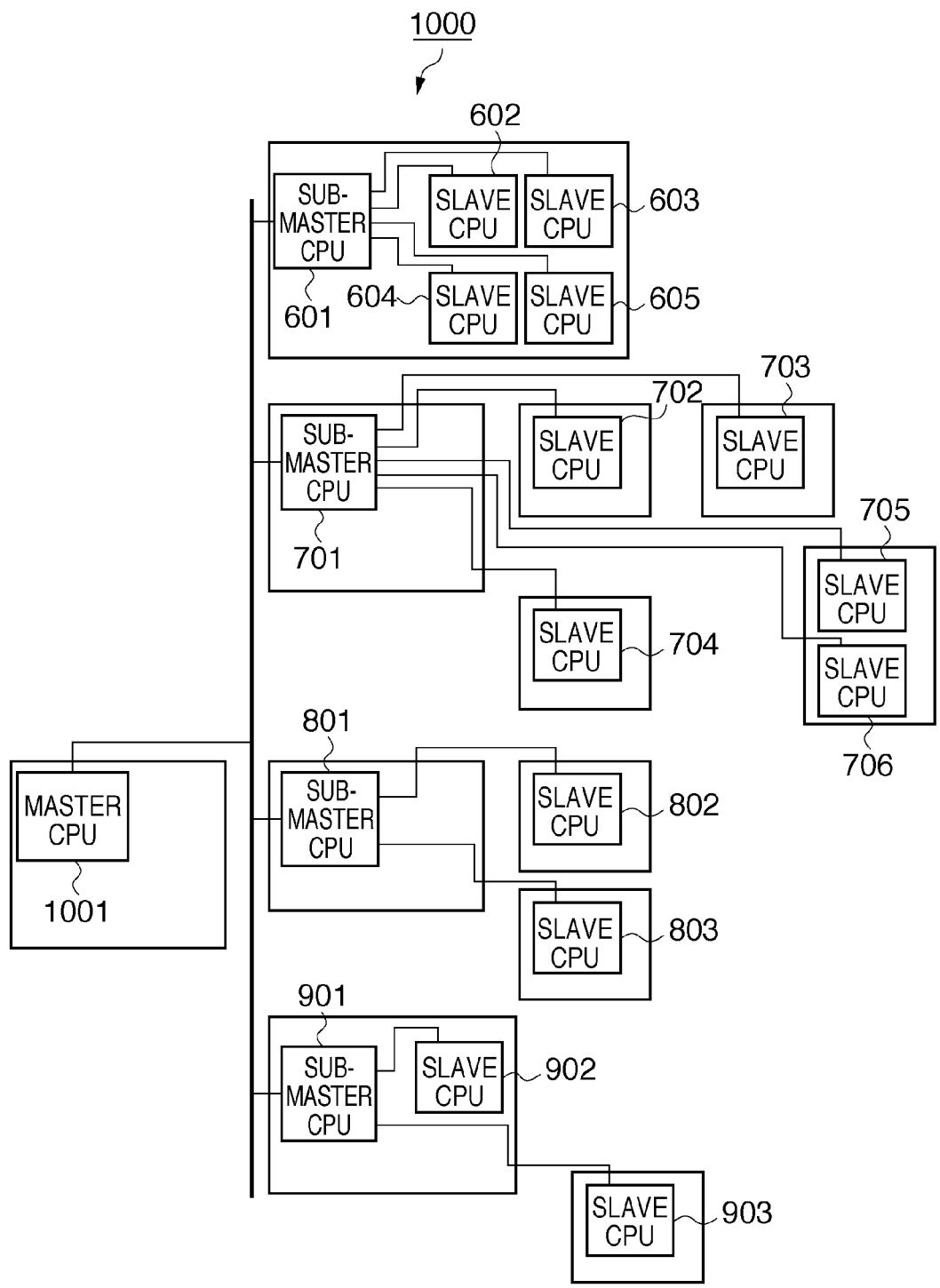
FIG. 4 is a diagram showing an example of a control board of the image forming apparatus 1000 according to Embodiment 1.

Next is a description of a specific arrangement configuration of the master CPU, the sub master CPUs, and the slave CPUs on boards in the present embodiment with reference to FIG. 4. As shown in FIG. 4, the present embodiment enables employing various control board configurations. For example, the sub master CPU 601 and the slave CPUs 602, 603, 604, and 605 are all implemented on the same board. Also, a sub master CPU and individual slave CPUs may be implemented on independent boards, as with the sub master CPU 701 and the slave CPUs 702, 703, and 704, and the sub master CPU 801 and the slave CPUs 802 and 803. Also, some slave CPUs may be implemented on the same board, as with the slave CPUs 705 and 706. Furthermore, a sub master CPU and only some slave CPUs may be arranged on the same board, as with the sub master CPU 901 and the slave CPU 902.

Figure 5:
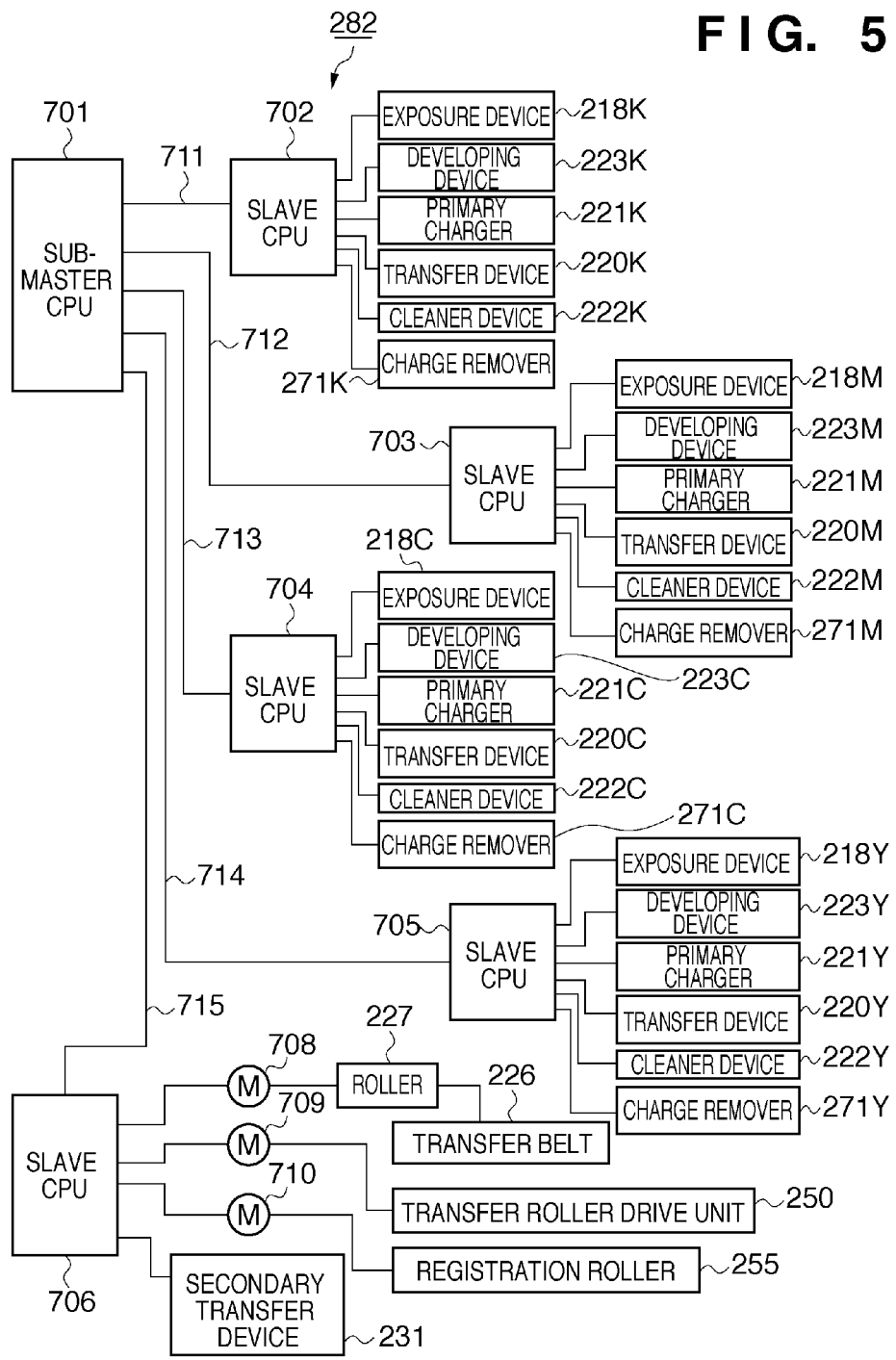
FIG. 5 is a diagram showing an example of a configuration of an imaging module 282 according to Embodiment 1.

FIG. 5 shows an example of a configuration of the imaging module 282 according to Embodiment 1. The imaging module 282 is in charge of imaging control including the transfer of a full-color toner image formed by an electrophotographic process onto the transfer belt 226, through to re-transfer of a toner image onto a printing material delivered from the feeding module A 280. The imaging module 282 includes the sub master CPU 701 that collectively controls imaging control, and the slave CPUs 702, 703, 704, 705, and 706 that drive control loads. Also, a directly-controlled control load group is connected to each of the slave CPUs.

The control loads of the slave CPU 702 are the exposure device 218K, the development device 223K, the primary charger 221K, the transfer device 220K, the cleaner device 222K, and the charge remover 271K, and the slave CPU 702 performs control through to the transfer of a black toner image to the transfer belt 226. The control loads of the slave CPU 703 are the exposure device 218M, the development device 223M, the primary charger 221M, the transfer device 220M, the cleaner device 222M, and the charge remover 271M, and the slave CPU 703 performs control through to the transfer of a magenta toner image to the transfer belt 226. The control loads of the slave CPU 704 are the exposure device 218C, the development device 223C, the primary charger 221C, the transfer device 220C, the cleaner device 222C, and the charge remover 271C, and the slave CPU 704 performs control through to the transfer of a cyan toner image to the transfer belt 226. The control loads of the slave CPU 705 are the exposure device 218Y, the development device 223Y, the primary charger 221Y, the transfer device 220Y, the cleaner device 222Y, and the charge remover 271Y, and the slave CPU 705 performs control through to the transfer of a yellow toner image to the transfer belt 226.

The control loads of the slave CPU 706 are a motor 708 of the roller 227 that rotationally drives the transfer belt 226, a high-voltage signal output device that drives the secondary transfer device 231, and drive source motors 709 and 710 that respectively drive the transfer roller drive unit 250 and the registration roller. The slave CPU 706 controls these control loads, and performs control through to the transfer of four colors of toner images, which have been transferred in multiple layers onto the transfer belt 226, to a printing material by the secondary transfer device 231. Note that in the present embodiment, the sub master CPU 701 is connected in one-to-one correspondence with the slave CPUs 702, 703, 704, 705, and 706 via the independent high-speed serial communication buses 711, 712, 713, 714, and 715 respectively. Also, although the above description is specific to the configuration of the sub master CPU 701 and the slave CPUs 702, 703, 704, 705, and 706, a similar configuration can be applied to communication between the other sub master CPUs 601, 801, and 901 and their slave CPUs.

Power Supply

Figure 6:
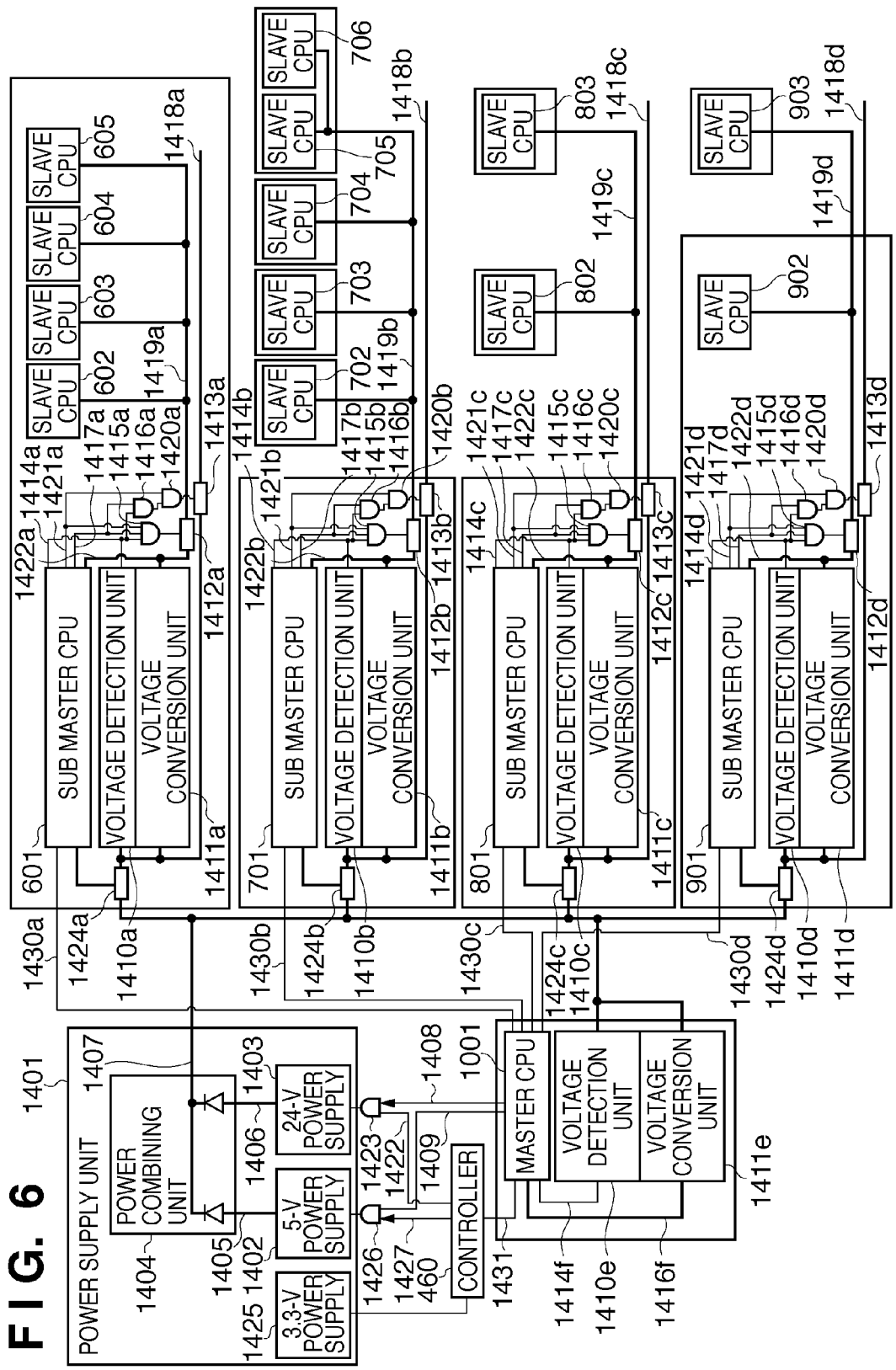
FIG. 6 is a diagram showing an example of a configuration of a power system according to Embodiment 1.
Figure 8B:
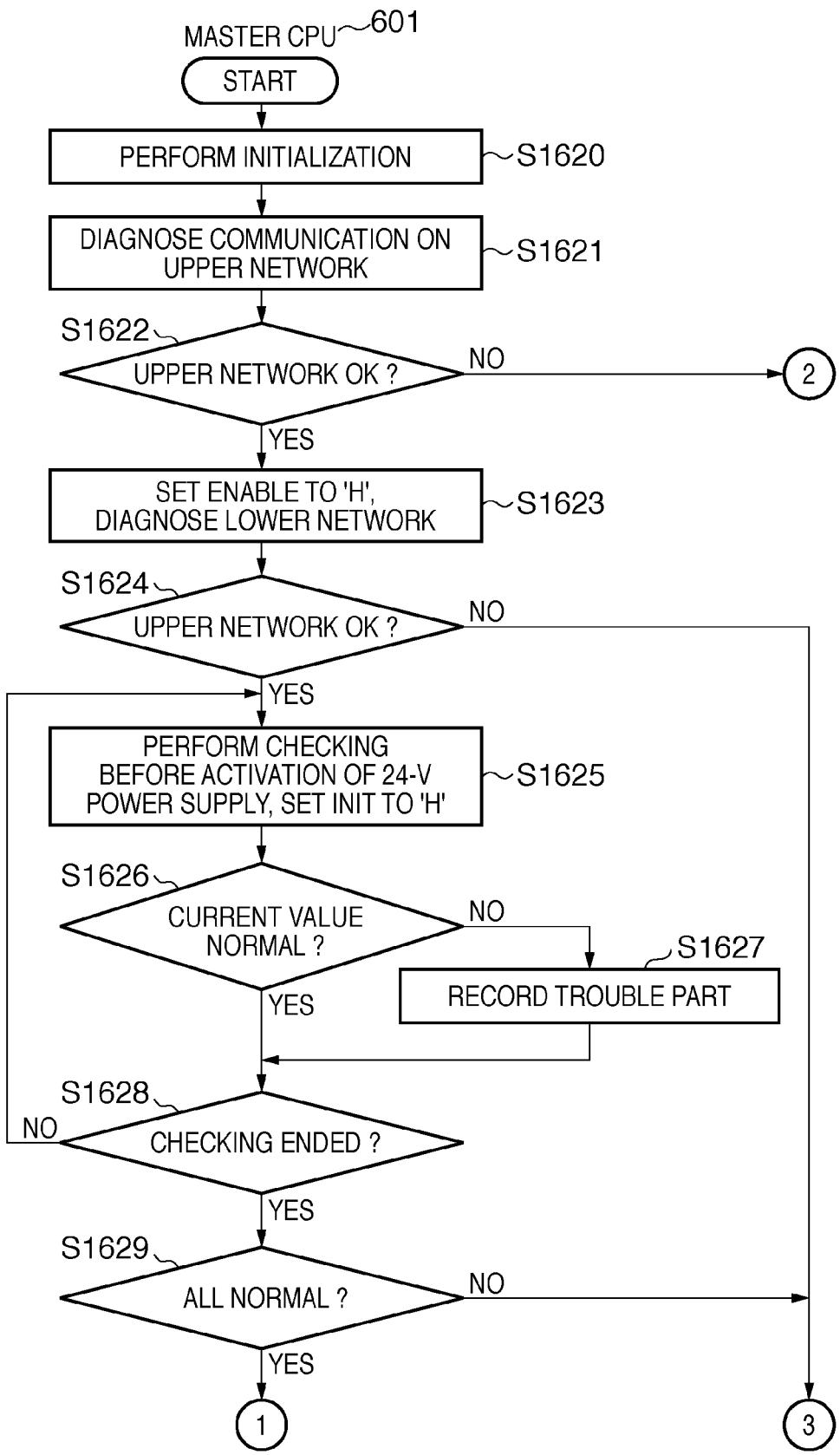
Figure 8C:
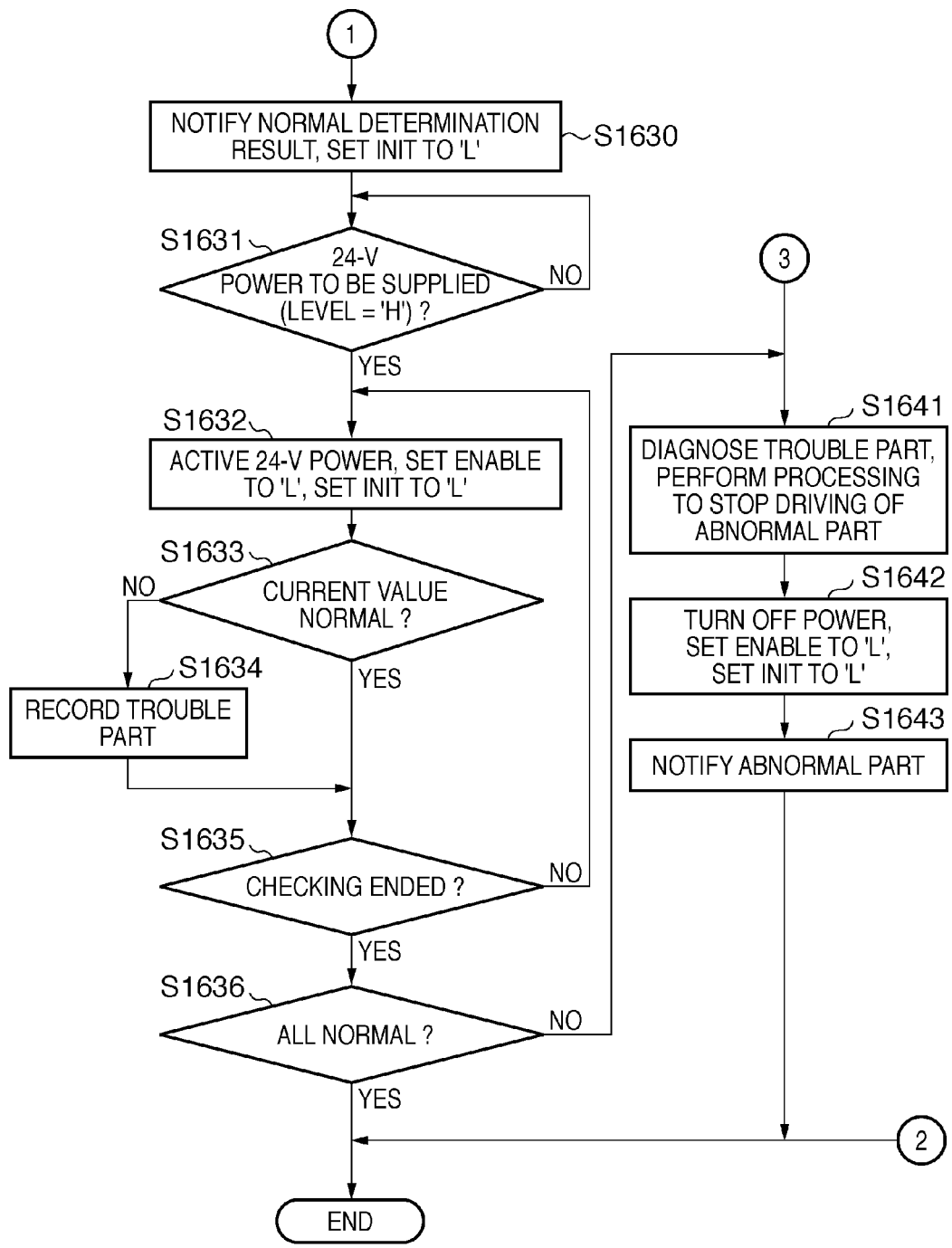

Next is a description of the supply of power to the modules in the present embodiment with reference to FIG. 6. Portions of the configuration shown in FIG. 6 that are the same as those in FIG. 4 have been given the same reference numerals, and descriptions thereof have been omitted. Note that power lines are indicated by thick lines in FIG. 6. As shown in FIG. 6, the power supply unit 1401 supplies power to the modules. The power supply unit 1401 includes a 5-V power supply 1402, a 24-V power supply 1403, a power combining unit 1404, and a 3.3V power supply 1425 that supply operating power to the entire apparatus. The 5-V power supply 1402 outputs a first voltage (5 V), and supplies power for the operation of only control ICs such as the CPUs. The 24-V power supply 1403 outputs a second voltage (24 V), and supplies power for the operation of control ICs and loads such as the motors. According to the present embodiment, the image forming apparatus 1000 has, as operation modes, a power saving mode of operating with use of the 5-V power supply 1402, and a normal mode of operating with use of the 24-V power supply 1403. Also, the sub master CPUs function as operation control units that determine the operating mode in accordance with the level of supplied power voltage, and control the objects for executing image formation. Also, in the present embodiment, the master CPU 1001 or the controller 460 functions as a power control unit that controls the above-described supply of power. Note that in the present embodiment, the master CPU 1001 functions as the first layer control unit, the sub master CPUs function as second layer control units, and the slave CPUs function as third layer control units.

The 24-V power supply 1403 and the 5-V power supply 1402 are controlled via OR logic gates 1426 and 1423 respectively, so as to enable their on and off states to be controlled by either the controller 460 or the master CPU 1001. The configuration enabling their on and off states to be controlled by both the controller 460 and the master CPU 1001 is employed in order to reliably supply power until both are in a state where the power may be interrupted. The power combining unit 1404 receives an input of output 1405 from the 5-V power supply 1402 and output 1406 from the 24-V power supply 1403, and in the example in FIG. 6, uses diodes to combine and output the power to a power line 1407 connected to the outputs in common. The power combining unit 1404 outputs a 5-V voltage when only the 5-V power supply 1402 is in the on state, and outputs a 24-V voltage when both the 5-V power supply 1402 and the 24-V power supply 1403 are in the on state, and when only the 24-V power supply 1403 is in the on state. According to the power combining unit 1404, even if the supply of power from the 24-V power supply 1403 is in the off state, power for driving control ICs can continue to be supplied by putting the supply of power from the 5-V power supply 1402 in the on state. In this way, the power supply unit 1401 can selectively output a 5-V voltage and a 24-V voltage. Although the 5-V power supply 1402 and the 24-V power supply 1403 are both on in the normal operation mode, the 24-V power supply 1403 having the higher potential supplies power to the power line 1407 due to the operation of the power combining unit 1404. The 5-V power supply 1402 is turned on in order to ensure that even if the 24-V power supply 1403 is interrupted due to operating overload or the like, power is supplied to devices that operate with use of a 5 V power supply.

Supplying power from the single power line 1407 enables preventing erroneous operation and a fault in which only high-voltage power is supplied due to partial disconnection of a power line. Also, the master CPU sends, to the sub master CPUs, a notification regarding switching to the power saving mode by performing control for switching the level of the voltage supplied to the slave CPUs from 24 V to 5 V. Also, the master CPU sends, to the sub master CPUs, a notification regarding reverting from the power saving mode to the normal mode by switching the level of the voltage supplied to the slave CPUs from 5 V to 24 V. Accordingly, the need to maintain communication between the master CPU 1001 and the sub master CPUs in order to send a notification regarding switching to and reverting from the power saving mode is eliminated, the number of constraints such as the frequency precision of the sub master CPUs during the power saving mode is reduced, and also the total power consumption of the communication units can be reduced.

The following is a description of a configuration of the modules with respect to output from the power supply unit 1401. In FIG. 6, although the configuration is common to the modules, different letters a to d have been appended to the reference numerals in order to indicate different parts. These letters have been omitted from the following description. A current detection unit 1424 detects the consumption of current in each module. The current value is converted into an analog voltage value. The output terminal of the current detection unit 1424 is connected to an analog-digital conversion terminal of the sub master CPU, and thus the power current is monitored. A voltage detection unit 1410 detects the voltage level of the power supplied from the power line 1407 with use of a predetermined threshold, and generates a LEVEL signal 1414. The LEVEL signal 1414 is output at H level if the voltage is greater than or equal to the threshold, and output at L level if the voltage is less than the threshold. The LEVEL signal 1414 is notified to the corresponding sub master CPU, and also transmitted to an OR logic gate 1415 and an AND logic gate 1416. A voltage conversion unit 1411 converts the voltage of input power into a voltage at which control units (the sub master CPU and slave CPUs) operate, and supplies the converted voltage to the sub master CPU and the slave CPUs. Specifically, the voltage conversion unit 1411 functions as an output unit, and converts the 5-V or 24-V voltage output from the power combining unit 1404 into the lower 3.3-V voltage. A power line 1422 is directly connected to the sub master CPU, and is connected to the slave CPUs via an SW unit 1412. The SW unit 1412 and an SW unit 1413 have a function for switching power with use of an FET. The SW unit 1413 receives output from the OR logic gate 1420 that outputs the result of an OR operation performed on an INIT signal 1421 from the sub master CPU and output from the AND logic gate 1416 that outputs the result of performing an AND operation on the LEVEL signal 1414 and an ENABLE signal 1417 from the CPU. The SW unit 1413 uses the received output as a signal for switching the power supply on and off. The switch unit 1413 performs control so as to switch the power supply on only if the voltage is greater than or equal to the voltage threshold, and the sub master CPU permits operation of the motors and the like. The INIT signal 1421 is used in processing for determining whether the condition of a power line 1418 and the driver ICs and the like connected to the power line 1418 is normal immediately after the activation of power in the device.

Similarly, the SW unit 1412 is switched in accordance with the output of the OR logic gate 1415. The OR logic gate 1415 is controlled in accordance with the result of an OR operation performed on the LEVEL signal 1414, the ENABLE signal 1417 from the CPU, and the INIT signal 1421. Although control of the ENABLE signal 1417 and the INIT signal 1421 is described in detail later, the circuitry is configured such that the SW unit 1412 is not off when the SW unit 1413 is on. Output 1419 of the SW unit 1412 is supplied as power to the slave CPU. Similarly, output 1418 of the SW unit 1413 is supplied as power to loads such as the driver ICs for driving the motors (not shown).

Next is a description of connections to the network-type communication bus 1002 and the high-speed serial communication buses with reference to FIG. 7. A connection to the network-type communication bus 1002 is realized by a master communication I/F unit included in a CPU and a transmitter IC set outside a CPU. The master CPU 1001 is connected to the network-type communication bus 1002 via a master communication I/F unit 1500a and a transmitter 1504a. On the other hand, the sub master CPU 601 is connected to the network-type communication bus 1002 via a master communication I/F unit 1500b and a transmitter 1504b. The network-type communication bus 1002 is an example of a CAN bus.

The transmitters 1504 and CPUs on the CAN bus are connected by a transmission 1501 and a reception 1502. The transmitters 1504 are each configured by a transmission buffer and a reception buffer, the output of the transmission buffer is connected to the input of the reception buffer, and thereafter they are connected to the network-type communication bus 1002. In actuality, the network side of the transmitter 1504 and the network-type communication bus 1002 are configured by differential signal lines.

A control signal 1503a is input from the master CPU 1001 to the transmitter 1504a, and the operation of the transmitter is permitted if an operation permission signal TX_ENBa indicates that transmission is permitted. On the other hand, if the control signal 1503a indicates that transmission is not permitted, the output of the transmitter 1504a enters a high impedance (Hi-Z) state. A control signal 1503b is input from the sub master CPU 601 to the transmitter 1504b, and is the same signal as the control signal 1503a.

Also, the sub master CPU 601 includes slave communication I/F units 1522a to 1522d, and performs communication with the slave CPUs 602 to 605 via slave communication I/F units 1523a to 1523d respectively provided therein and the communication lines 612 to 615. The same configuration applies to the sub master CPUs 701, 801, and 901 and their downstream slave CPUs, and thus a depiction and description thereof have been omitted.

Next is a description of a processing procedure performed by each CPU when activating power in the present embodiment with reference to FIGS. 8A to 8D. Although only a description regarding the master CPU 1001, the sub master CPU 601, and the slave CPU 602 is given below, the same processing is performed by the other sub master CPUs and slave CPUs. Note that reference numerals following the letter S in the below description indicate steps in the flowcharts.

First is a description of processing performed by the master CPU 1001. In S1600, when the 5-V power supply 1402 has been activated, the master CPU 1001 executes initialization processing such as initializing the internal RAM area and setting various types of registers. When initialization has ended, in S1601 the master CPU 1001 starts diagnosing the network-type communication bus 1002. Here, the permission signal TX_ENBa sent to the transmitter 1504a indicates that transmission is permitted. In S1602, the master CPU 1001 changes the output level of the transmission 1501a to the transmitter 1504b and checks whether the input level of the reception 1502a changes in the same way, and thus determines whether the operation of the transmitter is normal. In the case of a determination that the operation of the transmitter is normal, the procedure proceeds to S1603 in which the master CPU 1001 causes reset signals 1430a to 1430d sent to the sub master CPUs to be in a non-reset state, thus canceling the resetting. On the other hand, in the case of a determination that the operation of the transmitter is abnormal, the procedure proceeds to S1609 in which the master CPU 1001 diagnoses the trouble part, and thereafter in S1610 the master CPU 1001 determines and displays the trouble part.

If the resetting has been canceled in S1603, in S1604 the master CPU 1001 functions as a diagnosis unit that communicates with all of the sub master CPUs, including the sub master CPU 601, and makes a diagnosis as to whether communication with all of the sub master CPUs is possible. If a determination is made that communication with any of the sub master CPUs is not possible, the procedure proceeds to S1609 in which the master CPU 1001 diagnoses the trouble part, thereafter in S1610 the master CPU 1001 determines and displays the trouble part, and then processing ends. In other words, if an abnormality in communication with any of the sub master CPUs has been found, the master CPU 1001 prohibits the supply of power from the 24-V power supply 1403. As one example, in S1609 the master CPU 1001 successively checks whether communication is possible by cancelling the resetting of the sub master CPUs one at a time, and thus specifies the cause of the communication abnormality.

On the other hand, in the case of a determination that communication with all of the sub master CPUs is possible, in S1605 the master CPU 1001 instructs the sub master CPUs to perform a check before activation of the 24-V power supply 1403. Thereafter, in S1606, the master CPU 1001 waits until the diagnosing by the sub master CPUs has ended, and then in S1607 determines whether the results of all of the diagnoses were normal. If all of the results of the diagnoses were normal, in S1608 the master CPU 1001 activates the 24-V power supply 1403, and thereafter the processing ends. On the other hand, if an error has been confirmed, the master CPU 1001 diagnoses the trouble part in S1609, and determines the trouble part and displays information regarding the trouble part on the operation unit 10 in S1610.

Next is a description of processing performed by the sub master CPU 601. If resetting has been canceled by the reset signal 1430, in S1620 the sub master CPU 601 executes initialization processing such as initializing the internal RAM area and setting various types of registers. After the initialization has ended, in S1621 the sub master CPU 601 diagnoses communication via the network-type communication bus 1002 in accordance with the instruction from the master CPU 1001. Next, in S1622 the sub master CPU 601 determines whether communication was performed normally. If communication was performed normally, the procedure proceeds to S1623 in which the sub master CPU 601 sets an ENABLE signal 1417*a* to 'H' (enable state), starts the supply of power to the slave CPUs 602 to 605, and performs a communication diagnosis. On the other hand, if communication was not performed normally, the processing ends.

After the communication diagnosis has been performed in S1623, in S1624 the sub master CPU 601 determines whether communication with all of the slave CPUs 602 to 605 was performed normally. If communication with any of the slave CPUs was faulty, the procedure proceeds to S1641 in which the sub master CPU 601 diagnoses the trouble part, and then stops the supply of power to the corresponding slave CPU in S1642. Furthermore, in S1643 the sub master CPU 601 sends a notification regarding the abnormal part to the master CPU 1001, and thereafter processing ends. On the other hand, if communication with all of the slave CPUs was normal, in S1625 the sub master CPU 601 sets an INIT signal 1421*a* to 'H' (permission level) as a confirmation before activation of the 24-V power supply 1403. Next, in S1625 the sub master CPU 601 instructs the slave CPUs 602 to 605 to individually and sequentially drive the loads, such as a motor, that are connected to the slave CPUs. Furthermore, in S1626 the sub master CPU 601 checks for current fluctuation in the driving state with use of the current detection unit 1424*b*, and determines whether the current is normal. Here, if a determination that the current is abnormal has been made, the procedure proceeds to S1627 in which the sub master CPU 601 stores the examined part as an abnormality, and proceeds to S1628.

On the other hand, if a determination that the current is normal has been made in S1626, the procedure proceeds to S1628 in which the sub master CPU 601 determines whether all of the checking has ended. If all of the checking has not ended, the processing of S1625 to S1628 is repeated. On the other hand, if all of the parts have been checked, the procedure proceeds to S1629 in which the sub master CPU 601 determines whether the results of all of the checks are normal. If the results of all of the checks are normal, the procedure proceeds to S1630 in which the sub master CPU 601 sends a notification regarding the result to the master CPU 1001 and sets the INIT signal 1421*a* to 'L' level output. On the other hand, if the result of the any of the checks is abnormal, the above-described error processing of S1641 to S1643 is executed. If the normal notification has been sent in S1630, the master CPU 1001 performs the above-described processing of S1608 for prompting output of the 24-V power supply 1403.

Next, in S1631, the sub master CPU 601 detects the level of the supplied voltage with use of the voltage detection unit 1410*a*, and waits until the LEVEL signal 1414 switches to 'H'. When the LEVEL signal 1414 has switched to 'H', in S1632 the sub master CPU 601 sets the ENABLE signal 1417 to 'H' level, and sets the INIT signal 1421 to 'L' level. Next, in S1633 the sub master CPU 601 checks for current fluctuation in the driving state with use of the current detection unit 1424, and determines whether the current is normal. Here, if a determination that the current is abnormal has been made, the procedure proceeds to S1634 in which the sub master CPU 601 stores the examined part as an abnormality, and proceeds to S1635.

On the other hand, if a determination that the current is normal has been made in S1633, the procedure proceeds to S1633 in which the sub master CPU 601 determines whether all of the checking has ended. If all of the checking has not ended, the processing of S1632 to S1635 is repeated. On the other hand, if all of the parts have been checked, the procedure proceeds to S1636 in which the sub master CPU 601 determines whether the results of all of the checks are normal. The processing ends if the results of the all of the checks are normal, and the above-described processing of S1641 to S1643 is executed if any of the results of the checks is abnormal. Although the sub master CPU processing content has been described above taking the example of the sub master CPU 601, the other sub master CPUs also determine whether communication is normal by performing the same processing. The end of the determining performed by all of the sub master CPUs and all of the slave CPUs corresponds to the end of the diagnosing in S1606.

Next is a description of processing performed by the slave CPU 602. If the supply of power has been started due to the ENABLE signal 1417*a* being set to 'H' by the sub master CPU 601, in S1650 the slave CPU 602 executes initialization processing such as initializing the internal RAM area and setting various types of registers. When initialization has ended, in S1651 the slave CPU 602 diagnoses communication with the sub master CPU 601. Next, in S1652 the slave CPU 602 determines whether communication was performed normally. If communication was performed normally, the procedure proceeds to S1653 in which the slave CPU 602 starts the driver of a connected device and diagnoses communication with the device. On the other hand, if communication was not performed normally, the processing ends.

In S1654 the slave CPU 602 determines whether the diagnosis of communication with the device has ended. If the diagnosis has not ended, the slave CPU 602 cyclically repeats this determination until the diagnosis has ended. When the diagnosis has ended, the procedure proceeds to S1655 in which the slave CPU 602 determines whether the result of the diagnosis was normal. If the result of the diagnosis was normal, the processing ends, and if it was not normal, the procedure proceeds to S1656 in which the slave CPU 602 executes prohibition processing for prohibiting driving of the abnormal part, and thereafter processing ends.

Figure 10:
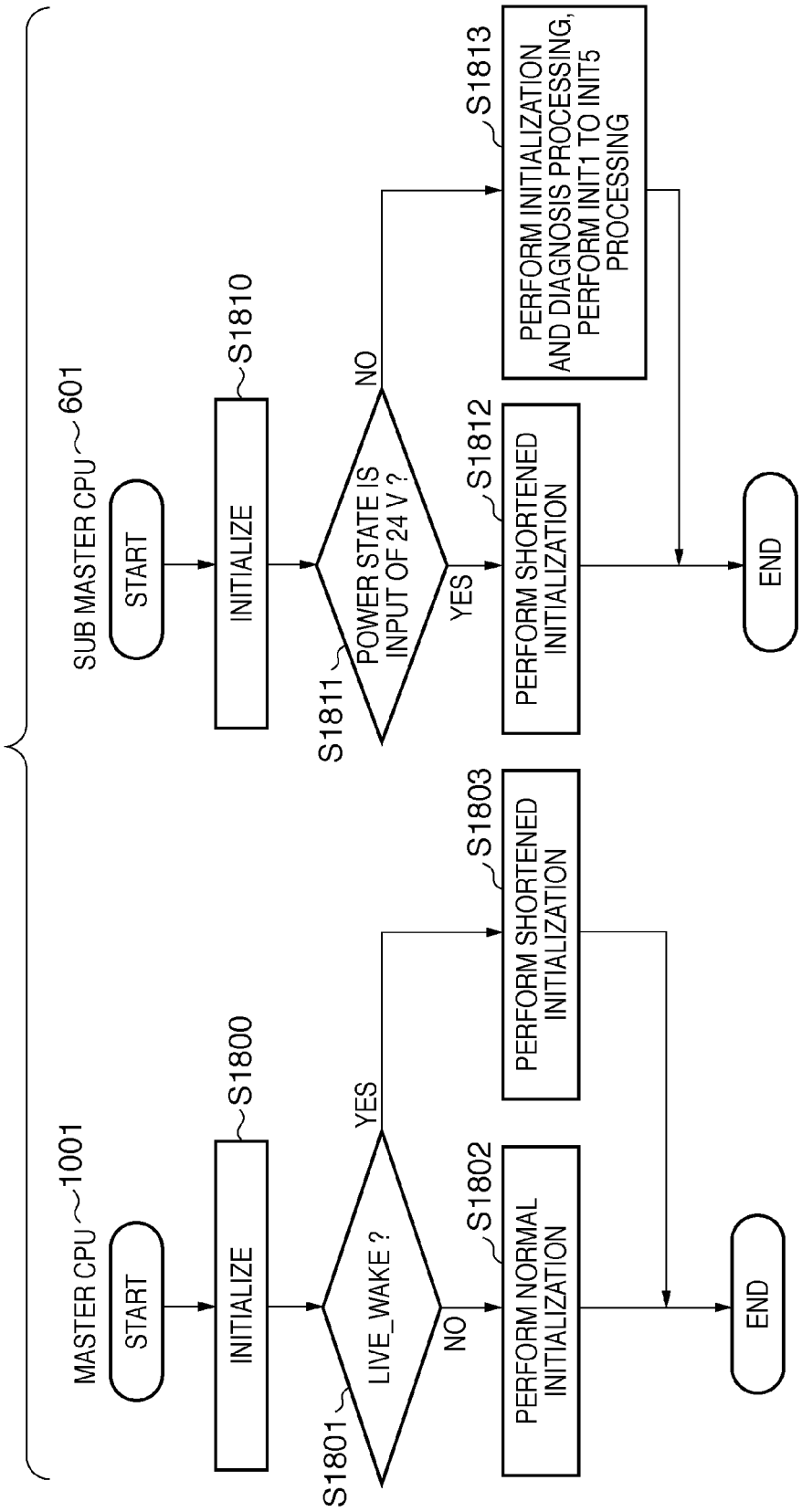
FIG. 10 is a flowchart showing a processing procedure performed by a master CPU 1001 and a sub master CPU 601 when activating power in the timing chart of FIGS. 9A and 9B.

Next is a description of timings according to which the master CPU 1001 changes the voltage supplied from the power supply unit 1401 to the power line 1407 and timings regarding the operation of a sub master CPU with reference to FIGS. 9 and 10. The timing chart in FIGS. 9A and 9B shows a flow of initialization processing after the activation of device power, and the transition to and recovery from the power saving mode during device operation. Also, the flowchart in FIG. 10 shows a processing procedure performed by the master CPU 1001 and the sub master CPU 601 when activating power in the timing chart in FIGS. 9A and 9B. The sub master CPUs 701, 801, and 901 execute the same processing as the sub master CPU 601, and therefore a description thereof has been omitted.

As shown in FIGS. 9A and 9B, in the case of the device power being supplied after being in an off state, firstly the power state transitions to an INIT1 state. In the INIT1 state, in S1800 the master CPU 1001 performs initialization processing such as initializing the internal RAM area and setting various types of registers. Next, in S1801, the master CPU 1001 checks the state of a LIVE_WAKE signal 1431 that indicates whether to revert from the power saving mode. Here, in the case of initial power activation, when processing in the INIT1 state has ended, the power state transitions to an INIT2 state. Specifically, the procedure proceeds to S1802, and the master CPU 1001 performs normal initialization operations. On the other hand, if the LIVE_WAKE signal 1431 indicates recovery from the power saving mode, the procedure proceeds to S1803 in which the master CPU 1001 performs control to turn on the 24-V power supply by switching the output of the OR logic gate 1423 from 'L' (output prohibited) to 'H' (output permitted), and executes a shortened initialization sequence.

Meanwhile, the sub master CPU 601 executes initialization processing in S1810, and when the reset state has been canceled, in S1811 the sub master CPU 601 checks the LEVEL signal 1414 from the voltage detection unit 1410, and determines whether the power state is 24-V input (second voltage) or 5-V input (first voltage). If 5-V power is being supplied, the power state transitions to the INIT2 state (S1813). In S1813, the sub master CPU 601 establishes communication and makes a fault diagnosis. Here, the sub master CPU 601 sets the transmitter 1504 to a use-permitted state (normal oscillation state), establishes communication via the network-type communication bus 1002, and makes a fault diagnosis. On the other hand, if 24-V power is being supplied, the power state transitions to an INIT6 state (S1812). The INIT6 state is described later.

Next, in the INIT3 state, the sub master CPU 601 switches the ENABLE signal to 'H' (output permitted), which is the permission state, thereby starting the supply of power (3.3 V: third voltage) to the slave CPUs via the power lines 1419, and then establishes communication with the slave CPUs and makes a trouble diagnosis, and thereafter the power state transitions to an INIT4 state. In the INIT4 state, the sub master CPU 601 asserts the INIT signal 1421 (that is, switches it to 'H' (output permitted)), and starts the supply of power (5 V) to the motor driver IC and the like via the power line 1418. Here, the slave CPUs check whether the driver ICs are operating abnormally by, one-by-one, causing them to operate (perform normal oscillation) and referencing the detection result of the current detection unit 1424. If normal system operation has been confirmed in the processing from the INIT1 state to the INIT4 state, the power state transitions to an INIT5 state. In the INIT5 state, the master CPU 1001 performs control to turn on the 24-V power supply 1403 by switching the output of the OR logic gate 1423 from 'L' (output prohibited) to 'H' (output permitted), and performs the same check processing as in the INIT4 state. Accordingly, the sub master CPU 601 causes the start of the supply of power (24 V) to the motor driver ICs and the like via the power lines 1418.

When initialization of the system has ended, the power state transitions to an IDLE state. In the IDLE state, the sub master CPU 601 sends a notification regarding switching to the power saving mode to the slave CPUs. Here, a low operating frequency is set in the slave CPUs (so as to perform low-speed oscillation). After the IDLE state has continued for a certain period of time (ΔT1 shown in FIGS. 9A and 9B), the power state transitions to a SLEEP1 state. In the SLEEP1 state, firstly the master CPU 1001 performs control to turn off the 24-V power supply 1403 by switching the output of the OR logic gate 1423 from 'H' (output permitted) to 'L' (output prohibited). The sub master CPU 601 then detects a change in the voltage level of the power line 1407 with use of the voltage detection unit 1410, and sets a low operating frequency for itself (so as to perform low-speed oscillation) by switching from the operating frequency of an external oscillator to that of an internal CR oscillation circuit. Furthermore, the sub master CPU 601 reduces current consumption by stopping the transmitter 1504*b* on the slave CPU side. At this time, the transmitter 1504*a* on the master CPU 1001 side continues to operate. This is done in order to enable communication with the slave CPU side as necessary. In the case of transitioning from the SLEEP1 state to the ACTIVE state, the master CPU 1001 performs control to turn on the 24-V power supply 1403 and detects a change in the voltage (from 5 V to 24 V) of the power line 1407 with use of the voltage detection unit 1410, and thus the sub master CPU 601 and slave CPUs revert to the normal operating state.

When the ACTIVE state has ended, the power state again transitions to the IDLE state, thereafter transitions to the SLEEP1 state when the time period ΔT1 has elapsed, and then transitions to a SLEEP2 state after a time period ΔT2 has elapsed. In the SLEEP2 state, the ENABLE signal 1417 is set to 'L' (output prohibited), and thus the supply of power to the slave CPUs is stopped. Then after the SLEEP2 state has continued for a time period ΔT3, the output of the OR logic gate 1426 is switched to 'L' (output prohibited), thus stopping supply from the 5-V power supply 1402, whereby the power of the master CPU 1001, the sub master CPU 601, and all of the slave CPUs is turned off (put in a SLEEP3 state). In the SLEEP3 state, only part of the circuitry of the controller 460 is operating with use of power supplied from the 3.3V power supply 1425.

Thereafter, if a key of the operation unit 10 is operated, a fax is received from a fax device, or a print job or the like is received from a LAN interface device, the controller 460 performs control so as to turn on the 5-V power supply 1402, and causes the power state to transition to the INIT1 state. In the INIT1 state, in S1800 the master CPU 1001 performs initialization processing such as initializing the internal RAM area and setting various types of registers. The power state then transitions to the INIT6 state. In the INIT6 state, the master CPU 1001 performs control to turn on the 24-V power supply 1403, and then cancels the resetting of the sub master CPU 601. Accordingly, the sub master CPU 601 also recognizes recovery from the power saving mode and executes initialization processing in which trouble diagnosis is not performed.

As described above, the image forming apparatus according to the present embodiment employs a distributed control system including a master CPU, a plurality of sub master CPUs, and a plurality of slave CPUs. Also, the master CPU supplies 5-V power to the sub master CPUs and the slave CPUs in the power saving mode, and supplies 24-V power thereto in the normal mode. Furthermore, the sub master CPUs determine the operating mode in accordance with the voltage level of the supplied power, and operate accordingly. Accordingly, the image forming apparatus can control the operating mode in accordance with the voltage of the supplied power, and it is possible to omit dedicated lines for the notification of the operating mode and a configuration for generating interrupts. Also, since power is supplied by switching two systems of power voltage, the image forming apparatus eliminates the need to control the operating clock of the CPUs in accordance with the operating mode. The present embodiment therefore enables suppressing system abnormalities caused by the failure to supply a voltage corresponding to the CPU clock.

The present invention is not limited to above-described embodiment, and can be modified in various ways. For example, the image forming apparatus of the present invention may be configured such that the power voltage is divided into two systems of voltages, 5-V power is supplied in initialization processing in the case of initial power activation, and the supply of 24-V power is restricted if an abnormal part has been found as a result of performing an abnormal part diagnosis. Accordingly, the image forming apparatus of the present invention enables suppressing system breakdown caused by excessive current and communication abnormalities. In other words, the image forming apparatus of the present invention can realize highly reliable power supply. Also, the image forming apparatus of the present invention may be configured such that in the power saving mode, if a predetermined time period has elapsed, the supply of 5-V power is stopped. This enables realizing power saving that is even more effective. Also, the image forming apparatus of the present invention may have a configuration in which only single power line is provided, and the 5-V power and the 24-V power are combined and output via the power line. In this case, the sub master CPUs selectively supply power voltage to the slave CPUs and loads in accordance with the voltage of the supplied power. This enables further reducing the number of power lines provided between the power supply unit and the CPUs.

Embodiment 2

Figure 11:
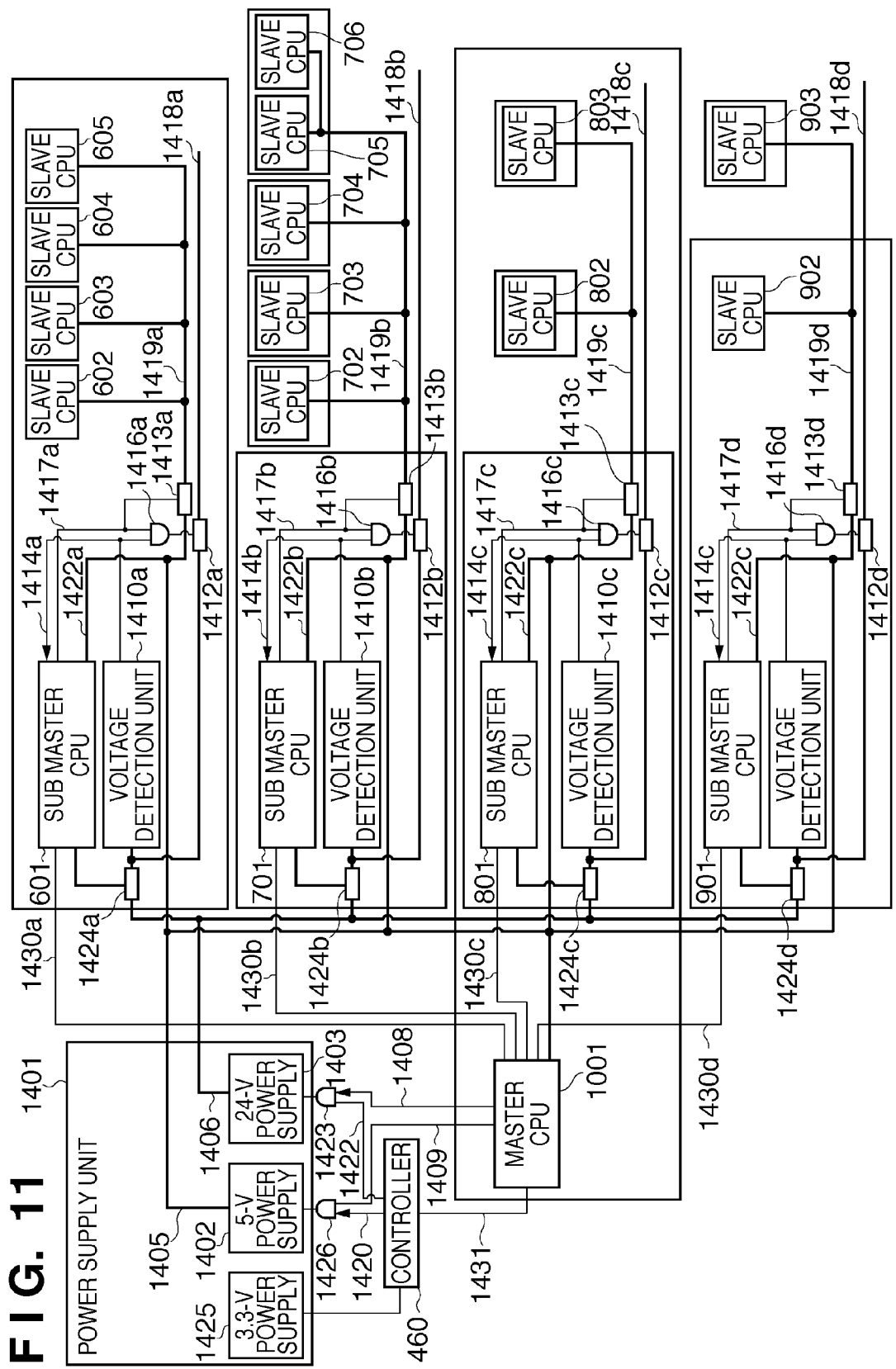
FIG. 11 is a diagram showing an example of a configuration of a power system according to Embodiment 2.

Next is a description of Embodiment 2 with reference to FIG. 11. In Embodiment 1, a description is given of a configuration in which the power combining unit 1404 is provided in the power supply unit 1401, and the number of power lines to the distributed boards is reduced. However, in the present embodiment, a configuration is described in which the power combining unit 1404 is not provided. Note that the same reference numerals have been given to parts of the configuration that are the same as in Embodiment 1, and descriptions thereof have been omitted.

In Embodiment 1, the processing performed by the sub master CPUs at the time of initialization is switched in accordance with the power voltage level. However, in the present embodiment, the sub master CPUs are connected to the 5-V power supply 1402 and the 24-V power supply 1403 by independent power lines 1405 and 1406. In view of this, in the present embodiment, control is performed such that only the 5-V power supply 1402 supplies power to the sub master CPUs at the time of reset cancelation when activating device power, and both the 5-V power supply 1402 and the 24-V power supply 1403 supply power in the case of reverting from the power saving mode. This enables realizing control similar to that in Embodiment 1. In the case of transitioning to the power saving mode as well, control similar to that in Embodiment 1 is possible if, while the 5-V power supply 1402 and the 24-V power supply 1403 are both supplying power, only the 24-V power supply 1403 is stopped.

Also, the present invention is not limited to the above-described Embodiments 1 and 2, and can be modified in various ways. For example, although power is supplied from one system to the sub master CPUs and the slave CPUs in the above-described embodiments, a configuration is possible in which a plurality of system are provided, and power is supplied to the sub master CPUs and the slave CPUs on a part-by-part basis. In this case, it is possible to perform fine power saving control in which power is supplied to only necessary parts in the entire system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-254448 filed on Nov. 5, 2009, which is hereby incorporated by reference herein in its entirety.

What is claimed is:

1. An image forming apparatus for forming an image on a printing material, the image forming apparatus comprising:
   a first layer control unit and a second layer control unit, wherein the first layer control unit controls the second layer control unit, and wherein the second layer control unit controls an object that is for executing image formation;
   a power supply unit that selectively supplies, to the second layer control unit, a first voltage and a second voltage that is higher than the first voltage; and
   a voltage detection unit that detects a voltage supplied from the power supply unit,
   wherein in a power saving mode, the first layer control unit causes the power supply unit to supply the first voltage to the second layer control unit, and in a normal mode, the first layer control unit causes the power supply unit to supply the second voltage to the second layer control unit, and
   wherein the second layer control unit executes the power saving mode in accordance with the first voltage having been detected by the voltage detection unit, and executes the normal mode in accordance with the second voltage having been detected by the voltage detection unit.

2. The image forming apparatus according to claim 1, wherein the second layer control unit further comprises a voltage conversion unit that converts the first voltage or the second voltage supplied from the power supply unit into a third voltage,
   wherein the third voltage converted by the voltage conversion unit is supplied to the second layer control unit, and
   wherein the second voltage is supplied to the object.

3. The image forming apparatus according to claim 1, wherein in a case where a predetermined time period has elapsed since a transition to the power saving mode, the first layer control unit stops the supply of voltage from the power supply unit.

4. The image forming apparatus according to claim 3, further comprising a single power line via which power voltage is output from the power supply unit,
   wherein the power supply unit comprises a combining unit that combines the first voltage and the second voltage and outputs a combined voltage, and
   wherein the second layer control unit further comprises an output unit that selectively outputs, as the first voltage or the second voltage, the combined voltage that has been supplied via the single power line.

5. The image forming apparatus according to claim 3, further comprising a power line for outputting the first voltage from the power supply unit and a power line for outputting the second voltage from the power supply unit.

6. The image forming apparatus according to claim 4, wherein at a time of initial power activation, the first layer control unit causes a transition from a state in which the power voltage is not being supplied to a state in which the first voltage is supplied, and
   wherein in the power saving mode, at a time of recovery from a state in which supply of the first voltage has been stopped, the first layer control unit causes a transition from a state in which the power voltage is not being supplied to a state in which the second voltage is supplied.

7. The image forming apparatus according to claim 5, wherein at a time of initial power activation, the first layer control unit causes a transition from a state in which the power voltage is not being supplied to a state in which the first voltage is supplied, and wherein in the power saving mode, at a time of recovery from a state in which supply of the first voltage has been stopped, the first layer control unit causes a transition from a state in which the power voltage is not being supplied to a state in which the first voltage and the second voltage are supplied.

8. The image forming apparatus according to claim 1, wherein upon a start of supply of the first voltage, the first layer control unit diagnoses whether communication with the second layer control unit is abnormal, and wherein in a case where communication with the second layer control unit is abnormal, the first layer control unit prohibits supply of the second voltage.

9. An image forming apparatus for forming an image on a printing material, the image forming apparatus comprising:

a first layer control unit and a second layer control unit, wherein the first layer control unit controls the second layer control unit, and wherein the second layer control unit controls an object that is for executing image formation;

a third layer control unit that is controlled by the second layer control unit and controls a load;

a power supply unit that selectively supplies, to the second layer control unit, a first voltage and a second voltage that is higher than the first voltage; and a voltage detection unit that detects a voltage supplied from the power supply unit, wherein in a power saving mode, the first layer control unit causes the power supply unit to supply the first voltage to the second layer control unit, and in a normal mode, the first layer control unit causes the power supply unit to supply the second voltage to the second layer control unit, wherein the second layer control unit executes the power saving mode in accordance with the first voltage having detected by the voltage detection unit, and executes the normal mode in accordance with the second voltage having been detected by the voltage detection unit, wherein the second layer control unit further comprises a voltage conversion unit that converts the first voltage or the second voltage supplied from the power supply unit into a third voltage that is lower than the first voltage, wherein the third voltage converted by the voltage conversion unit is supplied to the second layer control unit and the third layer control unit, and wherein the second voltage is supplied to the load.

10. An image forming apparatus comprising:

a first control unit and a second control unit that control a load that is for forming an image on a printing material;

a power supply unit that selectively supplies, to the second control unit, a first voltage and a second voltage that is higher than the first voltage; and a voltage detection unit that detects a voltage supplied from the power supply unit, wherein in a power saving mode, the first control unit causes the power supply unit to supply the first voltage to the second control unit, and in a normal mode, the first control unit causes the power supply unit to supply the second voltage to the second control unit, and wherein the second control unit executes the power saving mode in accordance with the first voltage having been detected by the voltage detection unit, and executes the normal mode in accordance with the second voltage having been detected by the voltage detection unit.

* * * * *